United States Patent
Ichikawa et al.

(10) Patent No.: US 12,057,719 B2
(45) Date of Patent: Aug. 6, 2024

(54) ELECTRIC WORK MACHINE AND BATTERY PACK

(71) Applicant: MAKITA CORPORATION, Anjo (JP)

(72) Inventors: Yoshitaka Ichikawa, Anjo (JP); Akihiro Nakamoto, Anjo (JP); Minoru Gyoda, Anjo (JP); Hayato Kano, Anjo (JP); Toru Yamada, Anjo (JP); Hitoshi Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 752 days.

(21) Appl. No.: 17/275,504

(22) PCT Filed: Sep. 12, 2019

(86) PCT No.: PCT/JP2019/035925
§ 371 (c)(1),
(2) Date: Mar. 11, 2021

(87) PCT Pub. No.: WO2020/054808
PCT Pub. Date: Mar. 19, 2020

(65) Prior Publication Data
US 2022/0123565 A1    Apr. 21, 2022

(30) Foreign Application Priority Data
Sep. 14, 2018   (JP) .................................. 2018-172746

(51) Int. Cl.
*H02P 1/00*   (2006.01)
*H01M 10/48*   (2006.01)
(Continued)

(52) U.S. Cl.
CPC ........... *H02J 7/0029* (2013.01); *H01M 10/48* (2013.01); *H02J 7/00032* (2020.01); *H02J 7/0063* (2013.01); *H02P 3/06* (2013.01)

(58) Field of Classification Search
CPC .... H02J 7/0029; H02J 7/00032; H02J 7/0063; H02P 3/06; H01M 10/48
(Continued)

(56) References Cited

U.S. PATENT DOCUMENTS

2005/0077878 A1   4/2005  Carrier et al.
2006/0245135 A1   11/2006 Lohr
(Continued)

FOREIGN PATENT DOCUMENTS

CN    101248364 A    8/2008
CN    101416330 A    4/2009
(Continued)

OTHER PUBLICATIONS

Office Action from the Japanese Patent Office dispatched May 16, 2023 in related Japanese application No. 2020-546198, and machine translation thereof.
(Continued)

*Primary Examiner* — Erick D Glass
(74) *Attorney, Agent, or Firm* — J-TEK LAW PLLC; Jeffrey D. Tekanic; Scott T. Wakeman

(57) ABSTRACT

A battery pack is configured to supply electric power to an electric work machine, such as a power tool or outdoor power equipment. The battery pack includes a first battery-signal terminal and a second battery-signal terminal. The first battery-signal terminal outputs, to the electric work machine, a first signal indicating that discharging is to be prohibited or permitted. The second battery-signal terminal outputs, to the electric work machine, a second signal indicating that discharging is to be prohibited or permitted. Thus, two communication paths are provided for transmitting signals to permit or prohibit discharging of the battery pack.

22 Claims, 15 Drawing Sheets

(51) Int. Cl.
*H02J 7/00* (2006.01)
*H02P 3/00* (2006.01)
*H02P 3/06* (2006.01)
*H02P 5/00* (2016.01)

(58) Field of Classification Search
USPC .......................................................... 318/139
See application file for complete search history.

(56) References Cited

U.S. PATENT DOCUMENTS

| | | |
|---|---|---|
| 2007/0128505 A9 | 9/2007 | Yahnker et al. |
| 2009/0108806 A1 | 4/2009 | Takano et al. |
| 2009/0153100 A1 | 6/2009 | Okumura et al. |
| 2009/0208821 A1 | 8/2009 | Kosugi et al. |
| 2011/0198103 A1 | 8/2011 | Suzuki |
| 2012/0118595 A1 | 5/2012 | Pellenc |
| 2012/0262035 A1 | 10/2012 | Takano et al. |
| 2013/0033233 A1 | 2/2013 | Noda et al. |
| 2013/0113438 A1 | 5/2013 | Aradachi et al. |
| 2015/0084554 A1 | 3/2015 | Tsuruta et al. |
| 2015/0222205 A1 | 8/2015 | Suda |
| 2015/0357853 A1 | 12/2015 | Suzuki et al. |
| 2016/0028344 A1 | 1/2016 | Kusakawa et al. |
| 2017/0033575 A1 | 2/2017 | Kaji et al. |
| 2017/0126036 A1 | 5/2017 | Dulle |
| 2017/0194670 A1 | 7/2017 | Kawano et al. |
| 2018/0345433 A1 | 12/2018 | Sudo et al. |
| 2020/0127339 A1 | 4/2020 | Nakano et al. |
| 2022/0115892 A1 | 4/2022 | Ichikawa et al. |

FOREIGN PATENT DOCUMENTS

| | | |
|---|---|---|
| CN | 101604849 A | 12/2009 |
| CN | 201609889 U | 10/2010 |
| CN | 102763304 A | 10/2012 |
| CN | 202964597 U | 6/2013 |
| CN | 104969408 A | 10/2015 |
| CN | 106410889 A | 2/2017 |
| CN | 106415915 A | 2/2017 |
| CN | 108290279 A | 7/2018 |
| DE | 102015116508 A1 | 3/2017 |
| EP | 2375542 A2 | 10/2011 |
| EP | 3150340 B1 | 3/2018 |
| IN | 104467546 A | 3/2015 |
| JP | 2005131770 A | 5/2005 |
| JP | 2005182522 A | 7/2005 |
| JP | 2007520180 A | 7/2007 |
| JP | 2008177138 A | 7/2008 |
| JP | 2010158163 A | 7/2010 |
| JP | 2010540258 A | 12/2010 |
| JP | 2011201004 A | 10/2011 |
| JP | 2011229319 A | 11/2011 |
| JP | 2013066960 A | 4/2013 |
| JP | 2013207898 A | 10/2013 |
| JP | 2013239259 A | 11/2013 |
| JP | 2014091176 A | 5/2014 |
| JP | 2014148008 A | 8/2014 |
| JP | 2014235839 A | 12/2014 |
| JP | 2015196196 A | 11/2015 |
| JP | 2016022566 A | 2/2016 |
| JP | 2016103937 A | 6/2016 |
| JP | 2017140686 A | 8/2017 |
| JP | 2017159449 A | 9/2017 |
| JP | 2017163808 A | 9/2017 |
| JP | 2017174683 A | 9/2017 |
| KR | 20160001373 A | 1/2016 |
| WO | 2005038952 A2 | 4/2005 |
| WO | 2016136499 A1 | 9/2016 |
| WO | 2019031273 A1 | 2/2019 |
| WO | 2019031274 A1 | 2/2019 |

OTHER PUBLICATIONS

Office Action from the Japanese Patent Office dispatched Jun. 27, 2023 in related Japanese application No. 2020-546057, and machine translation thereof.
Office Action from the Japanese Patent Office dispatched May 16, 2023, in related application No. JP 2020-546198, and machine translation thereof.
Supplementary European Search Report dispatched May 6, 2022, in related EP application No. 19 859 658.7, including examined claims 1-19.
English translation of the International Search Report dated Nov. 19, 2019 for related application No. PCT/JP2019/035739.
English translation of the Written Opinion of the International Searching Authority dated Nov. 19, 2019 for related application No. PCT/JP2019/035739.
Supplementary European Search Report dispatched Apr. 22, 2022, in related EP application No. 19 860 567.7, including examined claims 1-25.
English translation of the International Search Report dated Oct. 29, 2020 for parent application No. PCT/JP2019/035925.
English translation of the Written Opinion of the International Searching Authority for parent application No. PCT/JP2019/035925.
Office Action and Search Report from the Chinese Patent Office dispatched Jun. 29, 2023 in related application No. 201980059244.8, and translation thereof.
Office Action and Search Report from the Chinese Patent Office dispatched Jun. 29, 2023 in related application No. 201980059482.9, and translation thereof.
Office Action from the Chinese Patent Office dispatched Feb. 18, 2024 in counterpart CN application No. 201980059482.9, and translation thereof.
Office Action from the United States Patent Office mailed Aug. 31, 2023 in related U.S. Appl. No. 17/274,396, including examined claims 1-25.

ELECTRIC WORK MACHINE AND BATTERY PACK

CROSS-REFERENCE TO RELATED APPLICATIONS

This application is the US national phase of International patent application no. PCT/JP2019/035925 filed on Sep. 12, 2019, which claimed priority to Japanese Patent Application No. 2018-172746 filed on Sep. 14, 2018 at the Japanese Patent Office, the entirety of which is incorporated herein by reference in this patent application.

TECHNICAL FIELD

The present disclosure relates to an electric work machine and a battery pack.

BACKGROUND ART

A power tool described in Japanese Laid-open Patent Publication 2005-131770 comprises a pair of input terminals, which receives a supply of electric power from a battery pack, and a signal-input terminal, which inputs a discharge-stop instruction signal that is output from the battery pack. When the discharge-stop instruction signal is not input to the signal-input terminal, the power tool drives switching devices to control the electric current to a motor; on the other hand, when the discharge-stop instruction signal is input to the signal-input terminal, the power tool protects the battery pack by stopping the switching devices.

SUMMARY OF THE INVENTION

In communication between the battery pack and the power tool, it is possible that the following malfunction will occur. Specifically, a discharge-stop instruction signal is output from the battery pack but is not input to (at) the signal-input terminal. That is, the input state of the signal-input terminal enters a state indicating that discharging is to be permitted even though a discharge-stop instruction signal was output by the battery pack. If such a malfunction occurs in the above-described known power tool, then there is a possibility that discharging will adversely be permitted in a situation in which the battery pack should be protected, which will lead to premature deterioration of the battery pack.

The present disclosure provides a battery pack and an electric work machine in which deterioration of the battery pack can be curtailed.

In one aspect of the present disclosure, a battery pack is configured to supply electric power to an electric work machine, and comprises a first battery-signal terminal and a second battery-signal terminal. The first battery-signal terminal outputs, to the electric work machine, a first signal indicating that discharging is to be prohibited or permitted. The second battery-signal terminal outputs, to the electric work machine, a second signal indicating that discharging is to be prohibited or permitted.

The battery pack described above comprises the first battery-signal terminal, which outputs the first signal, and the second battery-signal terminal, which outputs the second signal. Consequently, even if a malfunction occurs wherein one of the first and second signals indicating that discharging is to be prohibited is received by the electric work machine instead as a signal indicating that discharging is to be permitted, the other signal indicating that discharging is to be prohibited is still received by the electric work machine. Consequently, the battery pack receives proper protection even if such a malfunction occurs, thereby reducing the likelihood of premature deterioration of the battery pack.

The first battery-signal terminal may be a dedicated terminal that outputs the first signal. The second battery-signal terminal may be a serial-communication terminal that outputs a plurality of battery signals, including the second signal.

The battery pack can output the second signal using the second battery-signal terminal, which outputs one or more other battery signals. Thereby, the battery pack outputs the first and second signals, and thereby can receive proper protection without having to increase the number of terminals.

The second signal may include a third signal that complies with a communication protocol and a fourth signal that does not comply with the communication protocol.

If the second signal include the signal that complies with the communication protocol and the signal that does not comply with the communication protocol, a prohibition of discharging can be transmitted from the battery pack to the electric work machine by a total of three types of signals. Accordingly, the battery pack receives proper protection, and thereby deterioration of the battery pack can be curtailed.

The second battery-signal terminal may be configured to continuously output a voltage of a first level during standby and to continuously output, as the fourth signal, a voltage of a second level that differs from the first level.

The noise tolerance of a signal in which the voltage level is constant is higher than a signal in which the voltage level fluctuates. Here, in the overloaded state, noise tends to be superimposed on the signal output from the battery pack. Thereby, by using a signal in which the voltage level is constant as the signal that does not comply with the communication protocol, the reliability with which the signal indicating that discharging is to be prohibited is received by the electric work machine can be made high when protection of the battery pack is needed.

A battery-control part may be provided that is configured, in response to the battery pack having entered the state in which the battery pack should be protected, to first transmit, via the second battery-signal terminal, the third signal indicating that discharging is to be prohibited.

In response to the battery pack having entered the state in which it should be protected, first, a signal that complies with the communication protocol is transmitted. Thereby, before stopping the discharging, the electric work machine identifies the state of the battery pack and thereby can take action in accordance with the state of the battery pack and the electric work machine.

The electric work machine may comprise a motor, a drive switch for causing the motor to be driven, and a latch circuit configured, in response to a signal indicating that discharging is to be prohibited being received while the drive switch is ON, to maintain the discharge-prohibited state until the drive switch is turned OFF. The first battery-signal terminal or the second battery-signal terminal may be configured such that it is connected to the latch circuit. A battery-control part may be provided that is configured, in response to the battery pack having entered the state in which the battery pack should be protected, to first transmit the signal indicating that discharging is to be prohibited via the one of the first battery-signal terminal or the second battery-signal terminal that is not connected to the latch circuit.

In the event that an abnormality in the battery-control part occurs and the signal indicating that discharging is to be prohibited disappears during the time a protection process of the battery pack should be performed, it is preferable to be able to avoid a sudden startup of the electric work machine (specifically, a sudden startup of the motor of the electric work machine). Consequently, the electric work machine may be provided with the latch circuit. However, once the latch circuit operates, it takes time to release (switch the state of) the latch circuit. Accordingly, in response to the battery pack having entered the state in which it should be protected, first, a signal indicating that discharging is to be prohibited is transmitted via the battery-signal terminal that is not connected to the latch circuit. Thereby, a sudden startup of the electric work machine can be avoided while the processing load on the battery pack and the electric work machine attendant with releasing the latch circuit can be curtailed.

The battery pack discussed above may comprise an auto-blow-type fuse, a detecting part, and a battery-control part. The auto-blow-type fuse is provided in an output current path of the electric power. The detecting part is configured to detect a discharge current. The battery-control part is configured to cause the auto-blow-type fuse to blow in the event that a discharge current is detected by the detecting part even though the first signal indicating that discharging is to be prohibited is transmitted via the first battery-signal terminal and the third signal and the fourth signal indicating that discharging is to be prohibited are transmitted via the second battery-signal terminal.

That is, if a discharge current is flowing (continues to flow) even though the three types of signals indicating that discharging is to be prohibited are transmitted to the electric work machine, then the auto-blow-type fuse is blown to protect the battery. Thereby, if discharging cannot be stopped otherwise when the battery pack is in the operable state, then the battery pack is placed into the inoperable state (by flowing the fuse), and thereby the safety of the battery pack can be ensured.

A battery-control part may be provided that is configured, when the battery pack has entered the state in which the battery pack should be protected, to transmit, via the first battery-signal terminal, the first signal indicating that discharging is to be prohibited and to transmit, via the second battery-signal terminal, the second signal in response to a request from the electric work machine.

The frequency of serial communication via the second battery-signal terminal may be higher when electric current is flowing from the battery pack to the electric work machine than when electric current is not flowing from the battery pack to the electric work machine.

When a current is not flowing from the battery pack to the electric work machine (i.e. a battery-idle state), the state of the battery pack changes significantly less than when a current is flowing from the battery pack to the electric work machine. Thereby, when a current is not flowing from the battery pack to the electric work machine, the frequency of the serial communication is controlled (set) to be lower than when a current is flowing from the battery pack to the electric work machine. Thereby, the processing load and the current consumption of the electric work machine and the battery pack can be curtailed in the battery-idle state.

When the battery pack has entered the state in which it should be protected, the battery-control part can transmit, in real time, the first signal indicating that discharging is to be prohibited. In addition, in response to a request from the electric work machine, the battery-control part can transmit the second signal based on the state of the battery pack when the request was received. Thereby, when a request has been received from the electric work machine, in the situation in which the battery pack is in the state in which the battery pack should be protected, the battery-control part can transmit, via the second battery-signal terminal, the second signal indicating that discharging is to be prohibited.

An electric work machine according to another aspect of the present disclosure comprises the battery pack discussed above, a motor, a first signal terminal, a second signal terminal, and a control part. The motor (i.e. the rotor thereof) is configured to rotate by receiving a supply of electric power from the battery pack. The first signal is input to the first signal terminal. The second signal is input to the second signal terminal. The control part is configured to receive the first signal input to the first signal terminal and the second signal input to the second signal terminal and to control the drive of the motor using the received first signal and the received second signal.

Even if a malfunction has occurred wherein, even though a signal indicating that discharging is to be prohibited is input from the battery pack, a signal indicating that discharging is to be permitted is received via one of the first signal terminal and the second signal terminal, the control part of the electric work machine can still receive, via the other terminal, a signal indicating that discharging is to be prohibited. Thereby, the battery pack is properly protected and deterioration of the battery pack can be curtailed.

The first signal terminal may be a dedicated terminal to which the first signal is input. The second signal terminal may be a terminal to which a plurality of battery signals, including the second signal, is input.

The second signal is input to the second signal terminal, to which a battery signal other than a signal indicating that discharging is to be permitted or prohibited is input. Thereby, the control part receives the first and second signals and can protect the battery pack in multiple ways without increasing the number of terminals of the electric work machine.

The control part may transmit an information-request signal, which requests the battery signal, via the second signal terminal and, in response to the information-request signal, may receive the second signal that is input to the second signal terminal from the battery pack. Furthermore, the control part may receive the first signal, which indicates discharging is to be prohibited, input from the battery pack to the first signal terminal when the battery pack has entered the state in which the battery pack should be protected.

When the battery pack has entered the state in which it should be protected, the control part can receive, in real time, the first signal indicating that discharging is to be prohibited. In addition, in response to an information-request signal transmitted by itself, the control part can receive the second signal based on the state of the battery pack. Thereby, in the situation in which the battery pack has entered the state in which it should be protected when an information-request signal has been received, the control part can receive, via the second signal terminal, the signal indicating that discharging is to be prohibited.

When the first signal terminal is not connected to the battery pack, the control part may receive, via the first signal terminal, the first signal indicating that discharging is to be prohibited.

When the first signal terminal and the battery pack are not connected, the control part stops the discharging of the battery pack, because the control part has received the first signal indicating that discharging is to be prohibited, and thereby it can protect the battery pack.

The second signal terminal may be a serial-communication terminal. The control part may be configured such that, while serial communication is not established between the electric work machine on the battery pack, the same process is performed as in the situation in which the second signal indicating that discharging is to be prohibited has been received.

Because the second signal terminal is a serial-communication terminal, the electric work machine can receive a plurality of battery signals via the second signal terminal. Furthermore, while serial communication is not established between the electric work machine and the battery pack, the electric work machine performs the same process as in the situation in which a second signal indicating that discharging is to be prohibited has been received. Thereby, while serial communication is not established between the electric work machine and the battery pack, the electric work machine stops the discharging of the battery pack and thereby can protect the battery pack.

The second signal terminal may be a serial-communication terminal. The frequency of the serial communication via the second signal terminal may be higher when electric current is flowing from the battery pack to the electric work machine than when electric current is not flowing from the battery pack to the electric work machine.

When electric current is not flowing from the battery pack to the electric work machine (i.e. the battery-idle state), the state of the battery pack changes significantly less than when electric current is flowing from the battery pack to the electric work machine. Thereby, when electric current is not flowing from the battery pack to the electric work machine, the frequency of the serial communication is controlled (set) to be lower than when electric current is flowing from the battery pack to the electric work machine. Thereby, the processing load and the current consumption of the electric work machine and the battery pack can be curtailed in the battery-idle state.

The control part, in response to a signal indicating that discharging is to be prohibited being received at a first timing via the first signal terminal or the second signal terminal, may stop the drive of the motor. Furthermore, in response to the one of the first signal terminal or the second signal terminal that is not receiving, at the first timing, a signal indicating that discharging is to be prohibited continuing to not receive a signal indicating that discharging is to be prohibited in the interval from the first timing until a set time has elapsed, the control part may prohibit restarting of the motor as long as a prescribed cancellation condition is not met.

Even though the control part has received, via one of the two signal terminals, a signal indicating that discharging is to be prohibited, if the control part has not received, via the other signal terminal, a signal indicating that discharging is to be prohibited, then there is a possibility that an abnormality has occurred. Thereby, in this situation, the control part prohibits restarting of the motor as long as the prescribed cancellation condition is not met. Thereby, the battery pack can be properly protected in the event of such an abnormality.

The prescribed cancellation condition may include removal of the battery pack from the electric work machine.

In this situation, the prohibition of restarting of the motor can be cancelled by the removal of the battery pack from the electric work machine.

The electric work machine discussed above may comprise a first connection path and a second connection path. The first connection path is configured to connect the first signal terminal and the control part. The second connection path is configured to connect the second signal terminal and the control part. A first connection path and the second connection path are separate, independent paths.

Because the first connection path and the second connection path are separate, independent paths, the battery pack can be protected more properly in multiple ways.

In the event that both the first signal indicating that discharging is to be permitted is received and the second signal indicating that discharging is to be permitted is received, the control part may permit discharging from the battery pack to the motor and thereby drive the motor.

The control part permits discharging from the battery pack to the motor only in the situation in which both the first and second signals indicate that discharging is to be permitted. Accordingly, if a malfunction has occurred wherein, even though two signals indicating that discharging is to be prohibited have been transmitted from the battery pack, only one signal indicating that discharging is to be permitted is received by the control part via one of the two signal terminals, then the control part prohibits discharging from the battery pack to the motor, and thereby can protect the battery pack.

Another aspect of the present disclosure is an electric work machine comprising a battery pack, a motor, and a control part. The motor is configured to rotate by receiving a supply of electric power from the battery pack. The control part is configured to control the drive of the motor. The battery pack comprises a first battery-signal terminal and a second battery-signal terminal. The first battery-signal terminal is configured to output a first signal indicating that discharging is to be prohibited or permitted. The second battery-signal terminal is configured to output a second signal indicating that discharging is to be prohibited or permitted. The control part comprises a first signal terminal and a second signal terminal. The first signal terminal is configured such that it is connected to the first battery-signal terminal. The second signal terminal is configured such that it is connected to the second battery-signal terminal. The control part is configured to control the drive of the motor using the first signal received via the first signal terminal and the second signal received via the second signal terminal.

The first signal and the second signal are transmitted from the battery pack to the control part of the electric work machine via different battery-signal terminals. That is, the battery pack comprises a plurality of means for transmitting, to the control part, signals indicating that discharging is to be prohibited. Thereby, the battery pack is more properly protected, and thereby deterioration of the battery pack can be curtailed.

The first signal may include a signal that does not comply with a communication protocol. The second signal may include a signal that complies with the communication protocol.

The signal that does not comply with the communication protocol and the signal that complies with the communication protocol can be transmitted from the battery pack to the control part via different battery-signal terminals.

The first battery-signal terminal may be a dedicated terminal for transmitting a signal from the battery pack to the control part. The second battery-signal terminal may be a serial-communication terminal for the transmission and reception of signals between the battery pack and the control part.

The second signal is transmitted from the battery pack to the control part using the serial-communication terminal, which is provided for performing serial communication between the battery pack and the control part. Thereby, the battery pack can be protected in multiple ways without increasing the number of terminals of the electric work machine and the battery pack.

The battery pack may comprise a battery-control part configured, in response to the battery pack having entered the state in which the battery pack should be protected, to transmit at least one of the first signal and the second signal indicating that discharging is to be prohibited. The battery-control part may be configured, in response to the battery pack having entered the state in which the battery pack should be protected, to first transmit the second signal, indicating that discharging is to be prohibited, by serial communication via the second battery-signal terminal.

In response to the battery pack having entered the state in which it should be protected, first, a signal that complies with the communication protocol is transmitted. Thereby, prior to stopping the discharging, the electric work machine identifies the state of the battery pack and thereby can take action in accordance with the state of the battery pack and the state of the electric work machine.

The electric work machine discussed above may further comprise a drive switch for causing the motor to be driven. The control part may comprise a latch circuit that is connected to the first signal terminal or the second signal terminal and may be configured, in response to a signal indicating that discharging is to be prohibited being inputted while the drive switch is ON, to maintain a discharge-prohibited state until the drive switch turns OFF. The battery pack may be configured to transmit the signal indicating that discharging is to be prohibited via the one of the first battery-signal terminal or the second battery-signal terminal that is not connected to the latch circuit and via the first signal terminal or the second signal terminal.

In response to the battery pack having entered the state in which it should be protected, first, a signal indicating that discharging is to be prohibited is transmitted via the battery-signal terminal that is not connected to the latch circuit. Thereby, a sudden startup of the electric work machine can be avoided while curtailing the processing load of the battery pack and the electric work machine attendant with releasing the latch circuit.

The second signal may include a third signal that complies with the communication protocol and a fourth signal that does not comply with the communication protocol. The first battery-signal terminal may be configured to continuously output, during standby, a voltage of a first level as the first signal. The second battery-signal terminal may be configured to output a serial-communication signal as the third signal, to continuously output, during standby, a voltage of a second level, and to continuously output a voltage of a third level, which differs from the second level, as the fourth signal.

In addition to the third signal (which is a serial signal), the fourth signal (which has high noise tolerance) is transmitted from the battery pack to the control part via the second battery-signal terminal. Thereby, the battery pack can be protected more properly without increasing the number of terminals of the electric work machine and the battery.

The present disclosure further includes the following items.

[Item A1]

An electric work machine comprises a motor, a first communication terminal, a second communication terminal, and a control part. The motor is configured to rotate by receiving a supply of electric power from the battery pack. First discharge information indicating that discharging of the battery pack is to be prohibited or permitted is input from the battery pack to the first communication terminal. Second discharge information indicating that discharging of the battery pack is to be prohibited or permitted is input from the battery pack to the second communication terminal. The control part is configured to receive the first discharge information input to the first communication terminal and the second discharge information input to the second communication terminal and to control the drive of the motor using the received first discharge information and the received second discharge information.

The electric work machine comprises the first and second communication terminals, to which discharge information is input from the battery pack. Consequently, even if a malfunction has occurred wherein, even though discharge information indicating that discharging is to be prohibited is input from the battery pack, discharge information indicating that discharging is to be permitted is received via one of the first communication terminal or the second communication terminal, the control part can still receive, via the other communication terminal, discharge information indicating that discharging is to be prohibited. Thereby, the battery pack is properly protected and deterioration of the battery pack can be curtailed.

[Item A2]

In addition, the first communication terminal may be a dedicated terminal to which the first discharge information is input. The second communication terminal may be a terminal to which a plurality of battery information, including the second discharge information, is input.

The second discharge information is input to the second communication terminal, to which battery information other than discharge information is input. Thereby, the control part receives the first and second discharge information and can doubly protect the battery pack without increasing the number of terminals of the electric work machine.

[Item A3]

In addition, the control part may transmit an information-request signal, which requests battery information, via the second communication terminal and, in response to the information-request signal, may receive the second discharge information that is input from the battery pack to the second communication terminal. Furthermore, the control part may receive the first discharge information, which indicates discharging is to be prohibited, input from the battery pack to the first communication terminal when the battery pack has entered the state in which the battery pack should be protected.

When the battery pack has entered the state in which it should be protected, the control part can receive, in real time, the first discharge information indicating that discharging is to be prohibited. In addition, in response to an information-request signal transmitted by itself, the control part can receive the second discharge information based on the state of the battery pack. Thereby, when the battery pack has entered the state in which it should be protected when an information-request signal has been received, the control part can receive, via the second communication terminal, the battery information indicating that discharging is to be prohibited.

[Item A4]

In addition, while the first communication terminal is not connected to the battery pack, the control part may receive, via the first communication terminal, the first discharge information indicating that discharging is to be prohibited.

While the first communication terminal and the battery pack are not connected, the control part stops the discharging of the battery pack and thereby can protect the battery pack, because the control part receives the first discharge information indicating that discharging is to be prohibited.

[Item A5]

In addition, the second communication terminal may be a serial-communication terminal. The control part may be configured such that, while serial communication is not established between the electric work machine on the battery pack, the same process is performed as in the situation in which the second communication terminal has received the second discharge information indicating that discharging is to be prohibited.

Because the second communication terminal is a serial-communication terminal, the electric work machine can receive a plurality of battery information via the second communication terminal. Furthermore, while serial communication is not established between the electric work machine and the battery pack, the electric work machine performs the same process as in the situation in which the second discharge information indicating that discharging is to be prohibited has been received. Thereby, while serial communication is not established between the electric work machine and the battery pack, the electric work machine stops the discharging of the battery pack and thereby can protect the battery pack.

[Item A6]

If the second communication terminal is a serial-communication terminal, then the frequency of serial communication via the second communication terminal may be set to be higher when electric current is flowing from the battery pack to the electric work machine than when electric current is not flowing from the battery pack to the electric work machine.

When electric current is not flowing from the battery pack to the electric work machine (i.e. the battery-idle state), the state of the battery pack changes significantly less than when electric current is flowing from the battery pack to the electric work machine. Thereby, when electric current is not flowing from the battery pack to the electric work machine, the frequency of the serial communication is controlled (set) to be lower than when electric current is flowing from the battery pack to the electric work machine. Thereby, the processing load and the current consumption of the electric work machine and the battery pack can be curtailed in the battery-idle state.

[Item A7]

In addition, the electric work machine may comprise a manipulatable part that is manipulated to issue an instruction to drive the motor. Furthermore, if discharge information indicating that discharging is to be prohibited has been received via one of the first communication terminal or the second communication terminal, then the control part stops the drive of the motor; furthermore, if discharge information indicating that discharging is to be prohibited has not been received via the other one of the first communication terminal or the second communication terminal within the set time since the discharge information indicating that discharging is to be prohibited was received via the one communication terminal, then the control part may prohibit restarting of the motor as long as the prescribed cancellation condition is not met.

Even though the control part has received, via one of the two communication terminals, discharge information indicating that discharging is to be prohibited, if the control part has not also received, via the other communication terminal, discharge information indicating that discharging is to be prohibited, there is a possibility that an abnormality has occurred. Thereby, in this situation, the control part prohibits restarting of the motor as long as the prescribed cancellation condition is not met. Thereby, the battery pack can be protected.

[Item A8]

The prescribed cancellation condition may include removal of the battery pack from the electric work machine.

In this situation, the prohibition of restarting of the motor can be cancelled by the removal of the battery pack from the electric work machine.

[Item A9]

In addition, the electric work machine may comprise the first connection path and the second connection path. The first connection path connects the first communication terminal and the control part. The second connection path connects the second communication terminal and the control part. The first connection path and the second connection path are separate, independent paths.

Because the first connection path and the second connection path are separate, independent paths, the battery pack can be doubly protected more properly.

[Item A10]

In addition, if the first communication terminal receives the first discharge information indicating that discharging is to be permitted and the second communication terminal receives the second discharge information indicating that discharging is to be permitted, then the control part may permit discharging from the battery pack to the motor and thereby drive the motor.

The control part permits discharging from the battery pack to the motor only in the situation in which both the first and second discharge information indicate that discharging is to be permitted. Accordingly, if a malfunction has occurred wherein, even though discharge information indicating that discharging is to be prohibited has been transmitted from the battery pack, discharge information indicating that discharging is to be permitted is received via one of the two communication terminals, then the control part prohibits discharging from the battery pack to the motor, and thereby can protect the battery pack.

[Item B1]

A battery pack that supplies electric power to an electric work machine comprises a first battery-communication terminal and a second battery-communication terminal. The first battery-communication terminal outputs, to the electric work machine, first discharge information indicating that discharging is to be prohibited or permitted. The second battery-communication terminal outputs, to the electric work machine, second discharge information indicating that discharging is to be prohibited or permitted.

The battery pack comprises the first battery-communication terminal, which outputs the first discharge information, and the second battery-communication terminal, which outputs the second discharge information. Consequently, even if a malfunction occurs wherein one of the first and second discharge information indicating that discharging is to be prohibited is received by the electric work machine as discharge information indicating that discharging is to be permitted, the other discharge information indicating that discharging is to be prohibited is received by the electric work machine. Consequently, the battery pack receives proper protection, and thereby deterioration of the battery pack can be curtailed.

[Item B2]

In addition, the first battery-communication terminal may be a dedicated terminal that outputs the first discharge information. The second battery-communication terminal may be a terminal that outputs a plurality of battery information, including the second discharge information.

The battery pack can output the second discharge information using the second battery-communication terminal, which outputs the other battery information. Thereby, the battery pack outputs the first and second discharge information, and thereby can receive proper protection without increasing the number of terminals.

[Item B3]

In addition, the battery pack may comprise a battery-control part that is configured, when the battery pack has entered the state in which the battery pack should be protected, to transmit, via the first battery-communication terminal, the first discharge information indicating that discharging is to be prohibited and to transmit, via the second battery-communication terminal, the second discharge information in response to a request from the electric work machine.

When the battery pack has entered the state in which it should be protected, the battery-control part can transmit, in real time, the first discharge information indicating that discharging is to be prohibited. In addition, in response to a request from the electric work machine, the battery-control part can transmit the second discharge information based on the state of the battery pack when the request was received. Thereby, when a request has been received from the electric work machine while the battery pack is in the state in which the battery pack should be protected, the battery-control part can transmit, via the second battery-communication terminal, the second discharge information indicating that discharging is to be prohibited.

EXPLANATION OF THE REFERENCE NUMBERS

Figure 1:
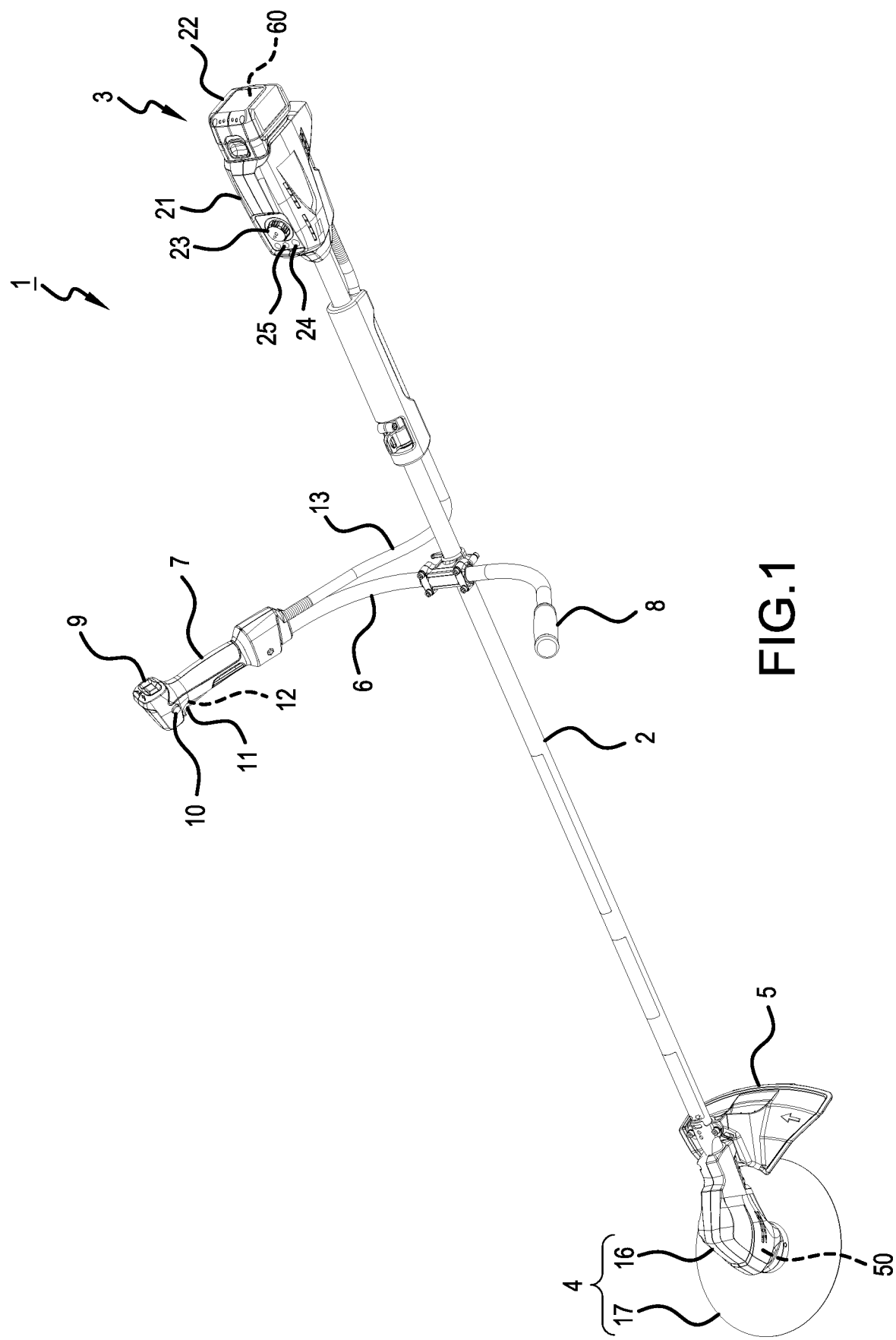
FIG. 1 is an oblique view of the external appearance of a work-machine system of a first embodiment.

1 Work machine
2 Main pipe
3 Control unit
4 Drive unit
5 Cover
6 Handle
7 Right grip
8 Left grip
9 Forward/reverse-changing switch
10 Lock-off button
11 Trigger
12 Trigger switch
13 Control-wiring pipe
16 Motor housing
17 Cutting blade
21 Rear-end housing
22 Battery pack
23 Speed-changing dial
24 Main switch
25 Display part
28 Battery-voltage detecting part
30 Controller
32 Drive circuit
34 Gate circuit
35 Latch circuit
36 Control circuit
38 Regulator
39 Stop circuit
41 Positive-electrode terminal
42 Negative-electrode terminal
43 DS terminal
44 Serial terminal
48 First connection wire
49 Second connection wire
50 Motor
52 Rotation sensor
54 Electric-current detecting part
56 Temperature-detecting part
60 Battery
61 Battery positive-electrode terminal
62 Battery negative-electrode terminal
63 Battery DS terminal
64 Battery serial terminal
65 Battery-control circuit
66 Fuse with auto-blow-type control
67 Shunt resistor
68 First battery-connection wire
69 Second battery-connection wire

DETAILED DESCRIPTION OF THE INVENTION

First Embodiment

Modes (embodiments) for carrying out the present disclosure are explained below, with reference to the drawings.

<1. Overall Configuration>

As shown in FIG. 1, an illustrative embodiment will now be explained in which a grass trimmer is described as an example of an electric work machine according to the present disclosure. The work-machine system of the present illustrative embodiment comprises a work machine (power tool) 1 and a battery pack 22. The work machine 1 is a grass trimmer that comprises a main pipe 2, a control unit 3, a drive unit 4, a cover 5, and a handle 6. The main pipe 2 is formed into an elongate and hollow rod shape. The control unit 3 is provided on a rear-end side of the main pipe 2. The drive unit 4 and the cover 5 are provided on a front-end side of the main pipe 2.

The drive unit 4 comprises a motor housing 16 and a cutting blade 17. The cutting blade 17 is a disk-shaped blade for cutting objects such as grass, small-diameter trees, or the like and is configured such that it is attachable to and detachable from the motor housing 16. The cover 5 is provided to deter grass or the like, which has been cut by the cutting blade 17, from flying toward the user of the work machine 1.

A motor 50, which generates rotational force for rotating the cutting blade 17, is mounted in the interior of the motor housing 16. The rotational force generated by the drive of the motor 50 is transmitted, via a speed-reducing mechanism, to a rotary shaft, on which the cutting blade 17 is mounted. When the cutting blade 17 is being rotated by the rotational force of the motor 50, the user can cut an object by bringing an outer-circumferential portion of the cutting blade 17 into contact with the object.

The handle 6 is formed into a U shape and is connected to the main pipe 2 in the vicinity of an intermediate location of the main pipe 2 in the length direction. A right grip 7, which is gripped by the user using his or her right hand, is provided on a first end side of the handle 6, and a left grip 8, which is gripped by the user using his or her left hand, is provided on a second end side of the handle 6.

A forward/reverse-changing switch 9, a lock-off button 10, and a trigger 11 are provided on a tip side of the right grip 7. The forward/reverse-changing switch 9 switches the rotational direction of the motor 50, that is, the rotational direction of the cutting blade 17, to either forward rotation or reverse rotation. It is noted that forward rotation is the rotational direction that is set when grass or the like is to be cut and reverse rotation is the rotational direction that is set when grass or the like entangled in the cutting blade 17 is to be removed.

The trigger 11 is a manipulatable member that is manipulated by the user to give instructions for rotating or stopping the cutting blade 17. A trigger switch 12, which is operatively coupled with the trigger 11, is disposed in the interior of the right grip 7. The trigger switch 12 turns ON when the trigger 11 is manipulated and turns OFF when the trigger 11 is not manipulated; the trigger switch 12 outputs a trigger signal that indicates an ON state or an OFF state thereof. In the present embodiment, the trigger switch 12 corresponds to one example of a drive switch.

The lock-off button 10 is a button for impeding or inhibiting the erroneous operation of the cutting blade 17. In the state in which the lock-off button 10 is not depressed, the lock-off button 10 mechanically engages with the trigger 11. Thereby, movement of the trigger 11 is restricted, and therefore the trigger switch 12 is impeded or inhibited from entering the ON state. In the state in which the lock-off button 10 is depressed, engagement with the trigger 11 is released by the lock-off button 10.

A control-wiring pipe 13 is provided between a lower end of the right grip 7 and a front end of the control unit 3. The control-wiring pipe 13 is formed into a hollow rod shape, and a control wire harness is provided and disposed in the interior of the control-wiring pipe 13. The control wire harness is for electrically connecting the trigger switch 12 and the forward/reverse-changing switch 9 to the control unit 3.

The control unit 3 comprises a rear-end housing 21 and the battery pack 22.

A speed-changing dial 23 and a main switch 24 are provided, in a user-manipulatable state, on a front-end side of the rear-end housing 21. The speed-changing dial 23 is provided for the user to variably set the rotational speed of the motor 50. The main switch 24 is a switch for placing the work machine 1 into the operable state by starting the electric supply from the battery 60 to each part. When the main switch 24 is ON, a discharge path from the battery 60 to the motor 50 is formed; when the main switch 24 is OFF, the discharge path from the battery 60 to the motor 50 is cut off.

Furthermore, a display part 25 is provided, in a manner visible to the user, on the front-end side of the rear-end housing 21. The display part 25 is provided to inform the user of the operation state, an abnormality, or the like and comprises a display lamp, remaining-capacity display lamps, a reverse-rotation display lamp, etc. The display lamp turns ON when the main switch 24 turns ON and thereby electric power is supplied to each part of the work machine 1. The remaining-capacity display lamps indicate the remaining capacity of the battery 60. The reverse-rotation display lamp indicates that the motor 50 is rotating in reverse. It is noted that the remaining capacity is the amount of electric power (electric charge) remaining in the battery 60.

A controller 30, which is described below, is disposed in the interior of the rear-end housing 21. The controller 30 principally performs control of the motor 50. The controller 30 controls the drive of the motor 50 by controlling the amount of electrical current supplied to the motor 50.

The battery pack 22 is configured such that it is attachable to and detachable from a rear-end portion of the rear-end housing 21.

Figure 2:
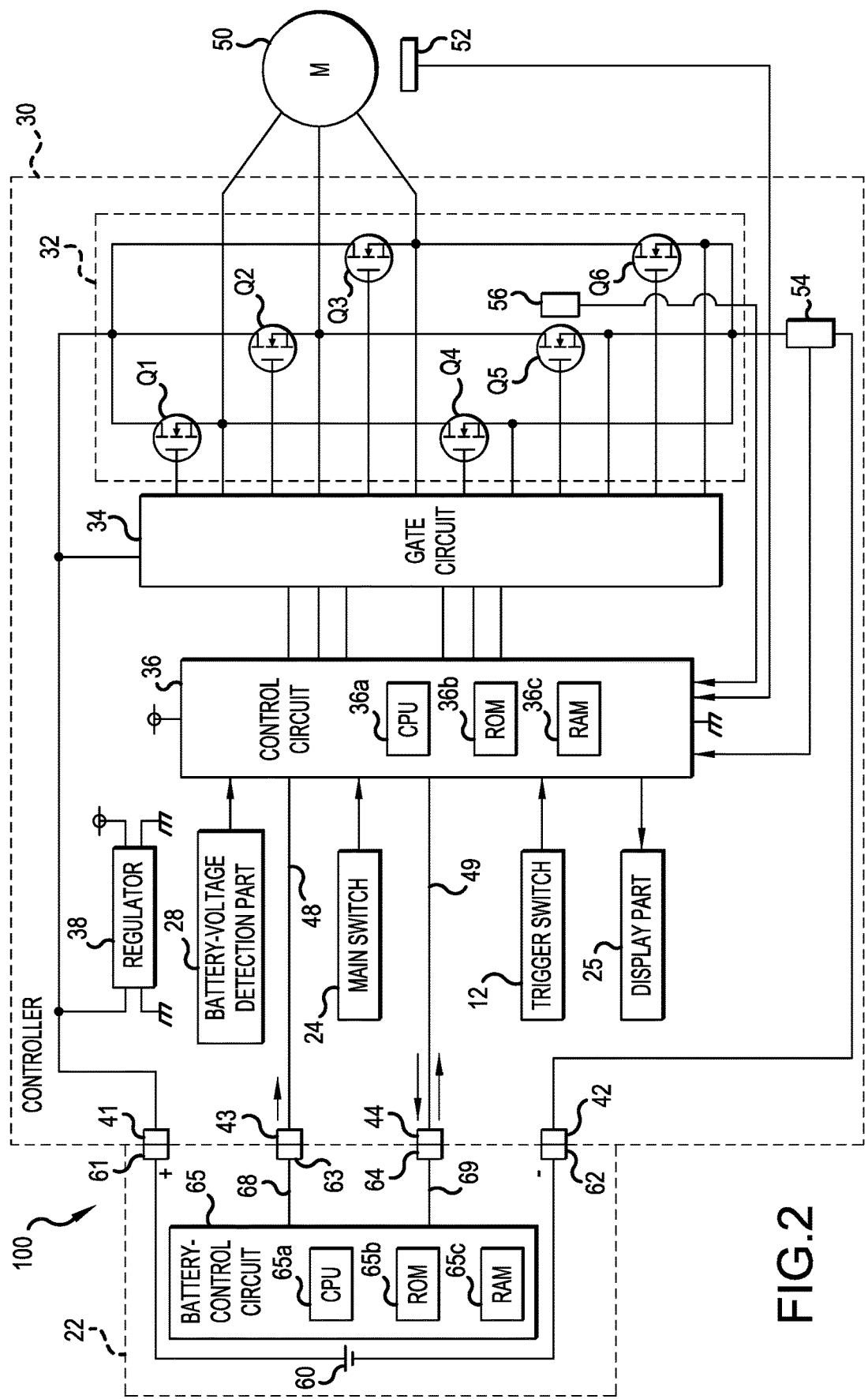
FIG. 2 is a block diagram of the configuration of a motor-control system according to the first embodiment.

As shown in FIG. 2, the battery pack 22 comprises the battery 60, a battery-control circuit 65, a battery positive-electrode terminal 61, a battery negative-electrode terminal 62, a battery DS terminal 63, and a battery TR terminal 64. The battery 60 is configured such that multiple battery cells are connected in series. The battery 60 is a rechargeable power supply for supplying electric power to each part inside the rear-end housing 21 and to the motor 50. The battery 60 comprises, as one example, a lithium-ion secondary battery. In addition, the rated voltage of the battery 60 may be, for example, 64 V.

<2. Configuration of Motor-Control System>

Next, a control system 100 for controlling the drive (energization) of the motor 50 will be explained, with reference to FIG. 2. The control system 100 comprises the battery-control circuit 65 and the controller 30.

The battery-control circuit 65 comprises a CPU 65a, ROM 65b, RAM 65c, I/O, etc., and performs an error-stop-signal control process, etc., which are described below.

The battery positive-electrode terminal 61 is connected to a positive-electrode side of the battery 60. The battery negative-electrode terminal 62 is connected to a negative-electrode side of the battery 60. The battery DS terminal 63 is connected to the battery-control circuit 65 via a first battery-connection wire 68. The battery DS terminal 63 is a dedicated terminal for transmitting a first signal from the battery pack 22. The first signal is a signal that does not comply with the communication protocol. DS is an abbreviation for discharge stop.

The battery TR terminal 64 is connected to the battery-control circuit 65 via a second battery-connection wire 69. The battery TR terminal 64 is a serial-communication terminal for transmitting a plurality of battery signals using serial communication. TR is an abbreviation for transmit/receive. The plurality of battery signals includes a second signal, which complies with the communication protocol.

The first battery-connection wire 68 and the second battery-connection wire 69 are separate, independent connection wires having no common portion. The first and second signals are signals that indicate that discharging from the battery 60 is to be prohibited or permitted. It is noted that, in the present embodiment, the battery-control circuit 65 corresponds to one example of a battery-control part, the battery DS terminal 63 corresponds to one example of a first battery-signal terminal, and the battery TR terminal 64 corresponds to one example of a second battery-signal terminal.

In addition, the battery pack 22 comprises a cell-voltage detecting part, a cell-temperature detecting part, and a battery-current detecting part, which are not shown. The cell-voltage detecting part detects the voltage value of each cell of the battery 60 and outputs detection signals to the battery-control circuit 65. The cell-temperature detecting part is constituted by a thermistor or the like, detects the temperature of at least one cell, and outputs a detection signal to the battery-control circuit 65. The battery-current detecting part detects the charge/discharge current of the battery 60 and outputs a detection signal to the battery-control circuit 65.

The controller 30 comprises a positive-electrode terminal 41, a negative-electrode terminal 42, a DS terminal 43, and a TR terminal 44. Furthermore, the controller 30 comprises a drive circuit 32, a gate circuit 34, a control circuit 36, and a regulator 38.

The positive-electrode terminal 41 is connected to the battery positive-electrode terminal 61 of the battery pack 22. The negative-electrode terminal 42 is connected to the battery negative-electrode terminal 62 of the battery pack 22. The DS terminal 43 is a terminal that is connected to the battery DS terminal 63 of the battery pack 22 and is a dedicated terminal for receiving the first signal transmitted from the battery pack 22. The TR terminal 44 is a terminal for receiving, by serial communication, the plurality of battery signals, which includes the second signal, transmitted from the battery pack 22.

The DS terminal 43 is connected to the control circuit 36 via a first connection wire 48, and the TR terminal 44 is connected to the control circuit 36 via a second connection wire 49. The first connection wire 48 and the second connection wire 49 are separate, independent connection wires having no common portion. That is, a DS-connection path and a serial-connection path are separate, independent paths having no common portion. The DS-connection path is a path that includes the first battery-connection wire 68 and the first connection wire 48 and connects the battery-control circuit 65 and the control circuit 36 via the battery DS terminal 63 and the DS terminal 43. The serial-connection path is a path that includes the second battery-connection wire 69 and the second connection wire 49 and connects the battery-control circuit 65 and the control circuit 36 via the battery TR terminal 64 and the TR terminal 44.

The drive circuit 32 is a circuit that receives the supply of electric power from the battery 60 and supplies electric current to winding wires corresponding to each phase of the motor 50. The motor 50 is a three-phase brushless motor. The drive circuit 32 is a three-phase, full-bridge circuit that comprises high-side switching devices Q1-Q3 and low-side switching devices Q4-Q6. Each of the switching devices Q1-Q6 includes, for example, a MOSFET but may include a device other than a MOSFET.

The gate circuit 34 turns each of the switching devices Q1-Q6 ON or OFF in accordance with control signals output from the control circuit 36 and, by sequentially supplying electric current to the winding wires of every phase of the motor 50, causes the motor 50 to rotate. It is noted that, when all the switching devices Q1-Q6 have been turned OFF, the motor 50 enters a free-run state. In addition, when all the switching devices Q1-Q3 have been turned OFF and all the switching devices Q4-Q6 have been turned ON, the motor 50 enters the state in which so-called short-circuit braking has been applied.

Simultaneous with the battery pack 22 being connected to the work machine 1, the regulator 38 receives the supply of electric power from the battery 60 and generates a constant power-supply voltage Vcc (e.g., 5 VDC) needed to operate the control circuit 36.

The control circuit 36 comprises a CPU 36a, ROM 36b, RAM 36c, I/O, etc. The DS terminal 43, the TR terminal 44, the trigger switch 12, the main switch 24, the display part 25, and a battery-voltage detecting part 28 are connected to the control circuit 36. In addition, although not shown, the forward/reverse-changing switch 9 and the speed-changing dial 23 are also connected to the control circuit 36.

The battery-voltage detecting part 28 detects the voltage between the positive-electrode terminal 41 and the negative-electrode terminal 42, that is, the value of the voltage of the battery 60 (hereinbelow, the battery voltage), and outputs a detection signal to the control circuit 36.

In the controller 30, an electric-current detecting part 54, which detects the value of the electric current flowing to the motor 50, is provided in an energization path extending from the drive circuit 32 to the negative electrode of the battery 60. In addition, a rotation sensor 52, which detects the rotational position of a rotor contained in the motor 50, is provided in the vicinity of the motor 50. The rotation sensor 52 is, for example, an optical encoder, a magnetic encoder, or the like. Furthermore, a temperature-detecting part 56, which is constituted by a thermistor, or the like, that detects the temperature of the switching devices, is provided in the vicinity of the switching devices of the drive circuit 32. Furthermore, detection signals from the electric-current detecting part 54, the rotation sensor 52, the temperature-detecting part 56, etc. are also input to the control circuit 36.

The control circuit 36 receives the supply of electric power from the regulator 38 and thereby operates. The control circuit 36 performs various processes, including a main process that is described below, based on the various detection signals and the various switch-manipulation states. It is noted that, in the present embodiment, the controller 30 corresponds to one example of a control part, the DS terminal 43 corresponds to one example of a first signal terminal, and the TR terminal 44 corresponds to one example of a second signal terminal.

<3. Processes of the Battery Pack>
<3-1. Discharge-Control Process>

Figure 3:
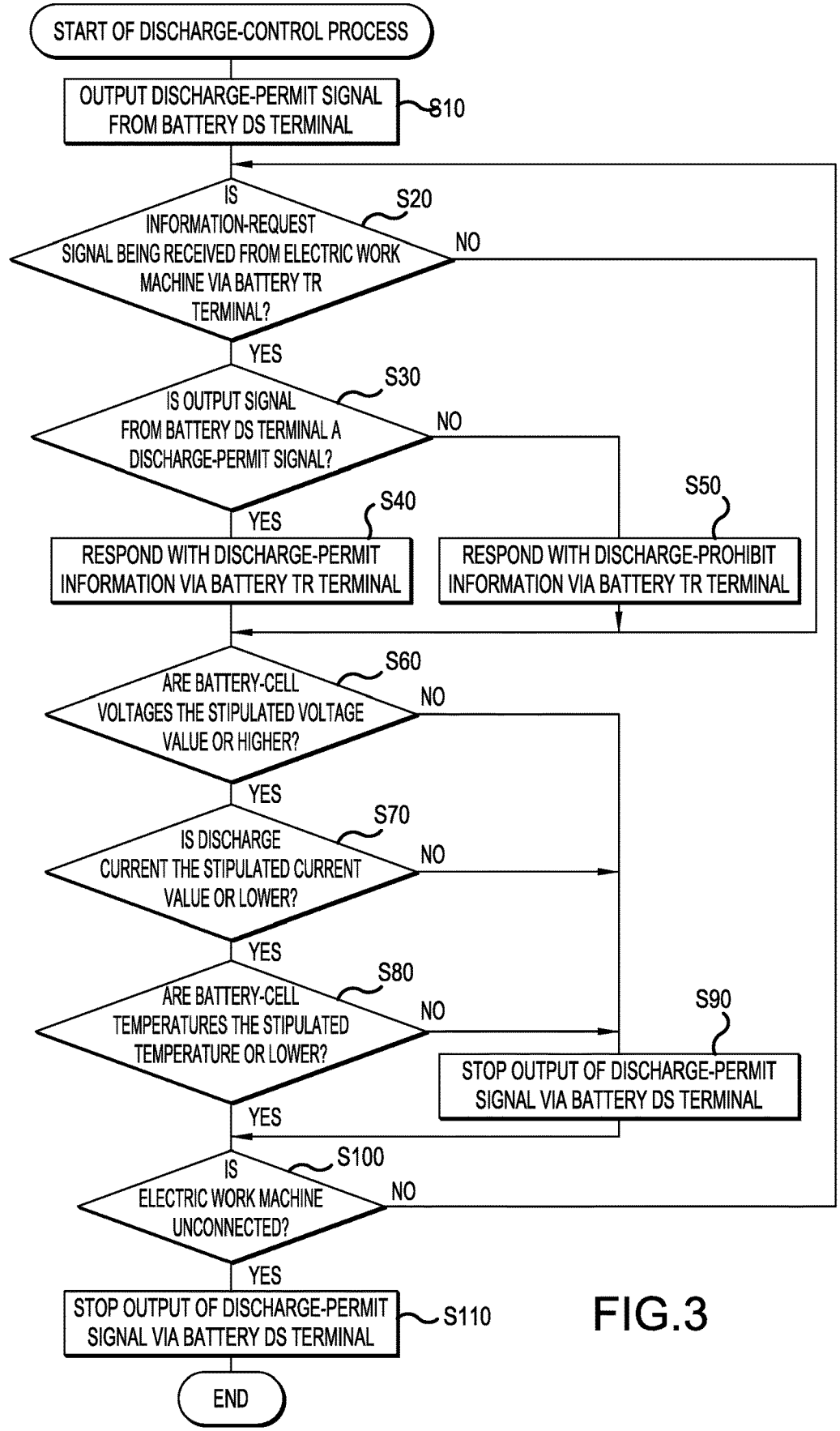
FIG. 3 is a flow chart of a discharge-control process, according to the first embodiment, which is performed by a battery-control circuit.

Next, a discharge-control process, which is performed by the battery-control circuit 65, will be explained, with reference to the flow chart in FIG. 3. When the battery-control circuit 65 detects the connection of an electric work machine, the present process starts.

First, in S10, the battery-control circuit 65 outputs a discharge-permit signal, which indicates discharging is to be permitted, from the battery DS terminal 63 as the first signal.

Then, in S20, the battery-control circuit 65 determines whether an information-request signal has been input from the work machine 1 via the battery TR terminal 64. The information-request signal is a signal that is output from the TR terminal 44 when the control circuit 36 requests a battery-information signal from the battery pack 22.

If it has been determined in S20 that an information-request signal has been input, then the battery-control circuit 65 proceeds to the process of S30. On the other hand, if it has been determined in S20 that an information-request signal has not been input, then the battery-control circuit 65 proceeds to the process of S60.

In S30, the battery-control circuit 65 determines whether an output signal from the battery DS terminal 63 is a discharge-permit signal. If it has been determined in S30 that the output signal is a discharge-permit signal, then the battery-control circuit 65 proceeds to S40. On the other hand, if it has been determined in S30 that the output signal is a discharge-prohibit signal indicating discharging is to be prohibited, then the battery-control circuit 65 proceeds to S50.

In S40 and S50, the battery-control circuit 65 outputs, in accordance with the information-request signal, a plurality of battery-information signals, including a second signal, from the battery TR terminal 64. In S40, the battery-control circuit 65 outputs, as the second signal, a discharge-permit signal, which indicates discharging is to be permitted. In S50, the battery-control circuit 65 outputs, as the second signal, a discharge-prohibit signal, which indicates discharging is to be prohibited. In addition, in S40 and S50, the battery-control circuit 65 outputs, as other battery signals, signals indicating information that concerns the remaining capacity (charge) and an overcurrent of the battery 60.

In S60, the battery-control circuit 65 determines whether the voltage values of the plurality of cells included in the battery 60 are all a stipulated voltage value or higher. If any of the cell-voltage values falls below the stipulated voltage value, then it is necessary to protect the battery 60 by stopping the discharging because there is a possibility that the battery 60 will deteriorate by permitting the discharging to continue. Consequently, in S60, the battery-control circuit 65 determines, based on the cell-voltage values, whether protection of the battery 60 is necessary.

If any of the cell-voltage values falls below the stipulated voltage value in S60, then the battery-control circuit 65 proceeds to the process of S90. In S90, the battery-control circuit 65 stops output of the discharge-permit signal from the battery DS terminal 63. In an embodiment in which the discharge-permit signal is a Hi-level signal (hereinbelow, Hi signal), when the output of the discharge-permit signal stops, a Lo-level signal (hereinbelow, Lo signal), which corresponds to the discharge-prohibit signal, is output from the battery DS terminal 63. On the other hand, in an embodiment in which the discharge-permit signal is a Lo signal, when the output of the discharge-permit signal stops, a Hi signal corresponding to the discharge-prohibit signal is output from the battery DS terminal 63. That is, when output of the discharge-permit signal from the battery DS terminal 63 stops, the discharge-prohibit signal is output from the battery DS terminal 63. At the point in time when protection of the battery 60 becomes necessary, the battery-control circuit 65 immediately outputs a discharge-prohibit signal from the battery DS terminal 63.

On the other hand, if every cell-voltage value is the stipulated voltage value or higher in S60, then the battery-control circuit 65 proceeds to the process of S70. In S70, the battery-control circuit 65 determines whether the value of the discharge current of the battery 60 is a stipulated current value or lower. If the value of the discharge current exceeds the stipulated current, then it is necessary to protect the battery 60 by stopping the discharging because there is a possibility that the battery 60 will deteriorate by permitting the discharging to continue. Thereby, in S70, the battery-control circuit 65 determines, based on the value of the discharge current, whether protection of the battery 60 is necessary.

In S70, if the value of the discharge current exceeds the stipulated current value, then the battery-control circuit 65 performs the process of S90.

On the other hand, in S70, if the value of the discharge current is less than the stipulated current, then the battery-control circuit 65 proceeds to the process of S80. In S80, the battery-control circuit 65 determines whether all the cell temperatures of the battery 60 are a stipulated temperature or lower. If any of the cell temperatures exceeds the stipulated temperature, then it is necessary to protect the battery 60 by stopping the discharging because there is a possibility that the battery 60 will deteriorate by permitting the discharging to continue. Thereby, in S80, the battery-control circuit 65 determines, based on the cell temperatures, whether protection of the battery 60 is necessary.

In S80, if any of the cell temperatures exceeds the stipulated temperature, then the battery-control circuit 65 performs the process of S90.

On the other hand, in S80, if every cell temperature is the stipulated temperature or lower, then the battery-control circuit 65 proceeds to the process of S100. In S100, the battery-control circuit 65 determines whether the work machine 1 is disconnected from the battery pack 22.

In S100, if the battery-control circuit 65 determines that the work machine 1 is connected, then the battery-control circuit 65 returns to the process of S20. On the other hand, in S100, if the battery-control circuit 65 determines that the work machine 1 is not connected, then the battery-control circuit 65 proceeds to the process of S110. In S110, the battery-control circuit 65 stops output of the discharge-permit signal from the battery DS terminal 63, the same as in the process of S90. The present process ends with the above.

<4. Processes of Electric Work Machine>

<4-1. Main Process>

Figure 4:
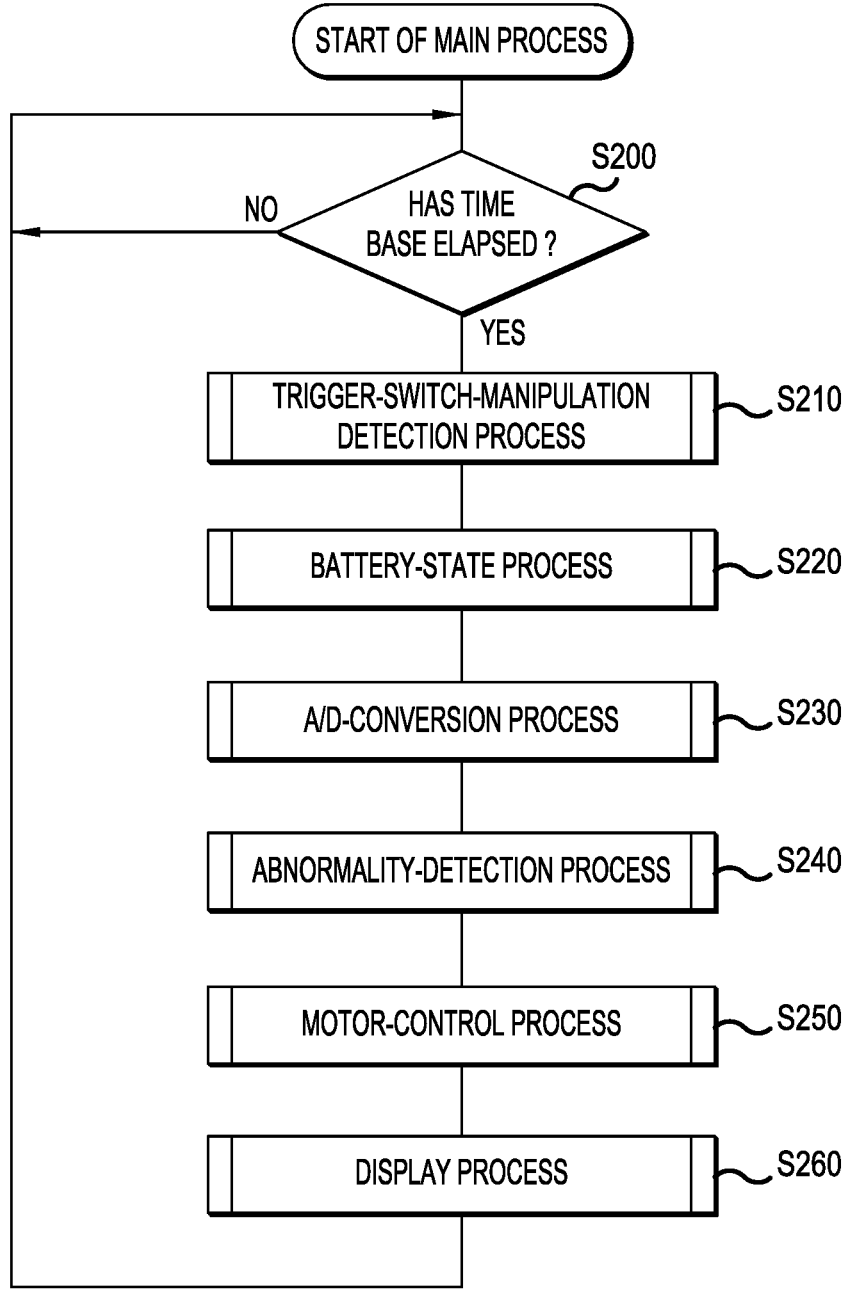
FIG. 4 is a flow chart of a main process, according to the first embodiment, which is performed by a control circuit of the work machine.

Next, a main process, which is performed by the control circuit 36 of the work machine 1, will be explained, with reference to the flow chart in FIG. 4.

First, in S200, the control circuit 36 determines whether a time base has elapsed. If the time base has not elapsed, then the control circuit 36 stands by; on the other hand, if the time base has elapsed, then the control circuit 36 proceeds to the process of S210. The time base corresponds to a control cycle of the control circuit 36.

In S210, the control circuit 36 performs a process of detecting manipulation of the trigger switch 12. In greater detail, the control circuit 36 detects, based on a signal from the trigger switch 12, whether the trigger switch 12 is ON or OFF.

Then, in S220, the control circuit 36 performs a battery-state process based on information output from the battery pack 22. The details of the battery-state process are described below.

Then, in S230, the control circuit 36 performs an A/D-conversion process. In greater detail, the control circuit 36 performs A/D conversion of the detection signals input from the battery-voltage detecting part 28, the electric-current detecting part 54, and the temperature-detecting part 56. Thereby, the control circuit 36 acquires the value of the current flowing to the motor 50, the value of the voltage of the battery 60, and the temperature(s) of the switching devices.

Next, in S240, the control circuit 36 performs an abnormality-detection process. In greater detail, the control circuit 36 detects whether any abnormality, such as an overcurrent, a drop in battery voltage, a high temperature state of the switching devices, or the like, is occurring by comparing the electric-current value, the voltage value, and the temperature(s) obtained in S230 with their respective thresholds. If an abnormality is detected, then the control circuit 36 sets a motor-abnormality flag.

Then, in S250, the control circuit 36 performs motor control based on the ON/OFF state of the trigger switch 12, the battery state, and the abnormality detection result. The details of a motor-control process are described below.

Next, in S260, the control circuit 36 performs a display process. In greater detail, the control circuit 36 notifies the user by displaying the operation state of the motor 50, the remaining capacity (charge) of the battery 60, any detected abnormality, etc. The present process ends with the above.

<4-2. Battery-State Identification Process>

Figure 5:
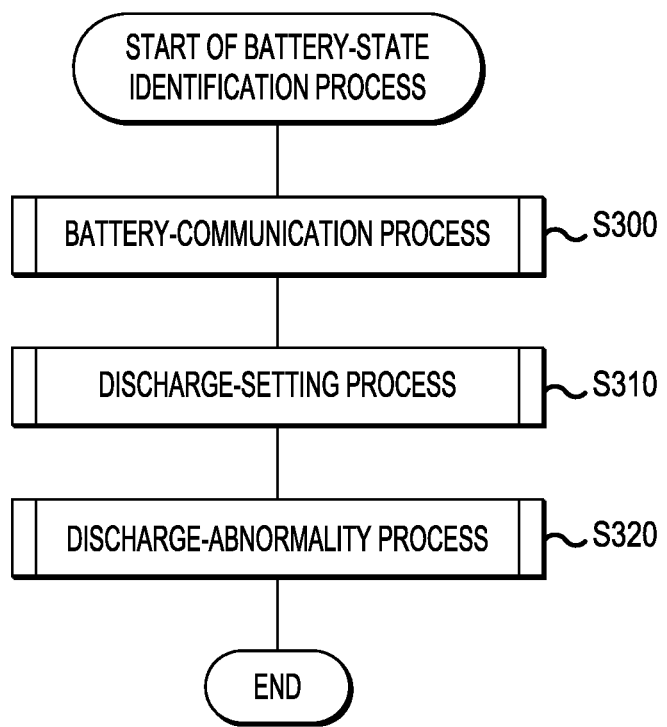
FIG. 5 is a flow chart of a battery-state identification process, according to the first embodiment, which is performed by the control circuit of the work machine.

Next, the details of a battery-state identification process, which is performed by the control circuit 36 in S220, will be explained, with reference to the flow chart in FIG. 5.

First, in S300, the control circuit 36 performs a battery-communication process. In greater detail, when the control circuit 36 detects that the battery pack 22 is mounted on the work machine 1, the control circuit 36 transmits, in an initial communication, information concerning the work machine 1 to the battery pack 22 via the TR terminal 44. Such information concerning the work machine 1 includes, for example, the model number of the work machine 1. In addition, the control circuit 36 receives information concerning the battery pack 22 from the battery pack 22 via the TR terminal 44. Such information concerning the battery pack 22 includes, for example, the model number of the battery pack 22.

Furthermore, the control circuit 36 transmits the information-request signal to the battery-control circuit 65 via the TR terminal 44 with a prescribed cycle and receives the battery-information signal from the battery-control circuit 65 in response to the information-request signal. In this regard, when a discharge current is not flowing from the battery pack 22 to the work machine 1, the cycle with which the information-request signal is transmitted is set to be longer than when a discharge current is flowing from the battery pack 22 to the work machine 1. That is, when a discharge current is not flowing from the battery pack 22 to the work machine 1, the frequency of the serial communication is set to be lower than when a discharge current is flowing.

Then, in S310, the control circuit 36 performs a discharge-setting process that sets the discharge state of the battery 60 based on the first signal and the second signal that were output from the battery pack 22. The details of the discharge-setting process are described below.

Then, in S320, the control circuit 36 performs a discharge-abnormality process based on the result of the discharge-setting process. The details of the discharge-abnormality process are described below. The present process ends with the above.

<4-3. Discharge-Setting Process>

Figure 6:
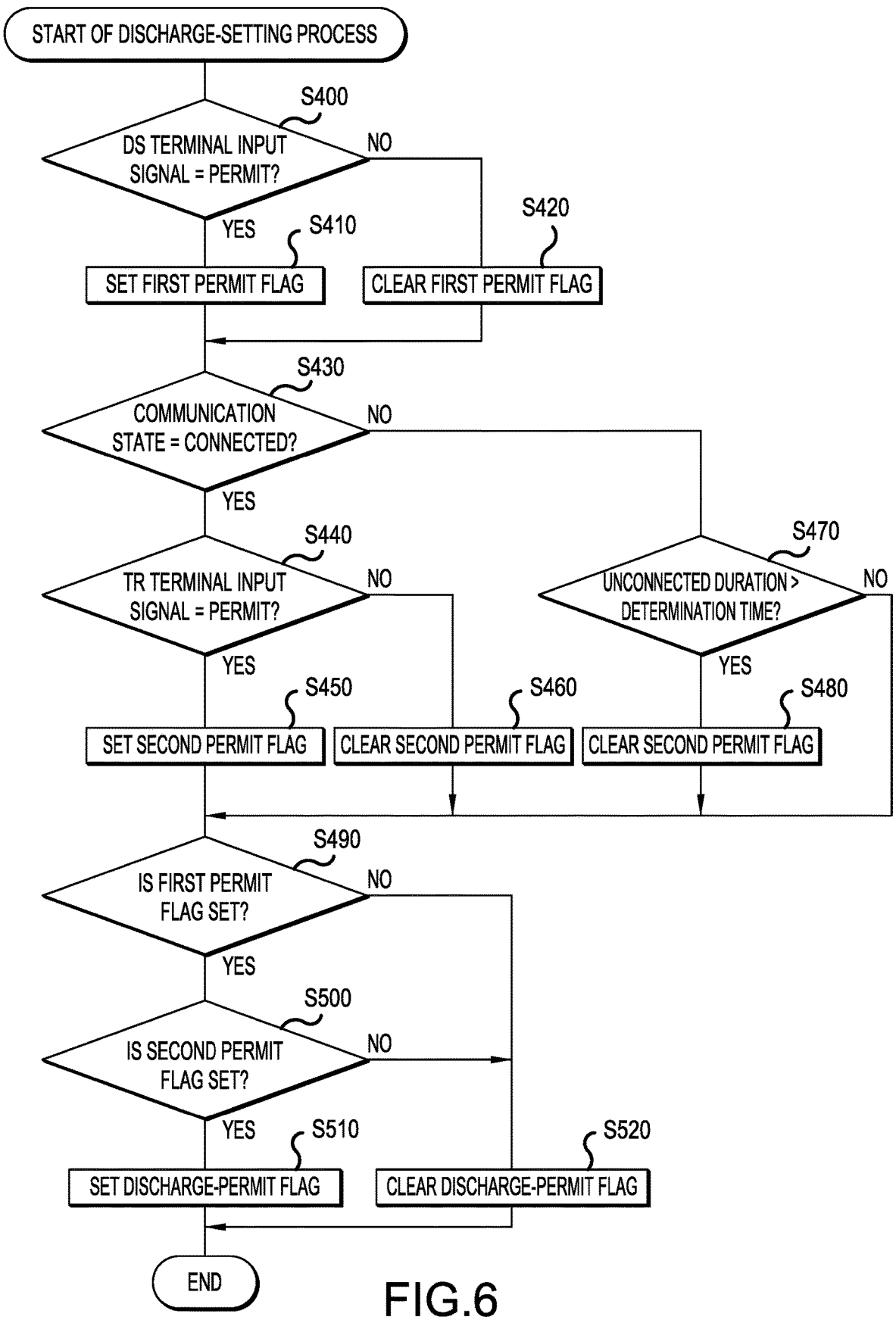
FIG. 6 is a flow chart of a discharge-setting process, according to the first embodiment, which is performed by the control circuit of the work machine.

Next, the details of the discharge-setting process, which is performed by the control circuit 36 in S310, will be explained, with reference to the flow chart in FIG. 6.

First, in S400, the control circuit 36 determines whether an input signal that is being input to the DS terminal 43 is a discharge-permit signal. In this regard, even if the work machine 1 and the battery pack 22 are not connected (i.e. even if the battery DS terminal 63 and the DS terminal 43 are not connected), the control circuit 36 receives a discharge-prohibit signal. That is, the electric potential of the first connection wire 48 is the same electric potential when a discharge-prohibit signal is output via the battery DS terminal 63 and when the battery DS terminal 63 is not connected to the DS terminal 43. The control circuit 36 proceeds to the process of S410 when the input signal is determined to be the discharge-permit signal; on the other hand, it proceeds to the process of S420 when the input signal is determined to be a discharge-prohibit signal.

In S410, the control circuit 36 sets a first permit flag and then proceeds to the process of S430.

In addition, in S420, the control circuit 36 clears the first permit flag and then proceeds to the process of S430.

In S430, the control circuit 36 determines whether the state of communication with the battery-control circuit 65 is the connected state. That is, the control circuit 36 determines whether serial communication with the battery-control circuit 65 has been established. Specifically, when the control circuit 36 transmits an information-request signal to the battery-control circuit 65 and there is a response, the control circuit 36 determines that the communication state is the connected state; on the other hand, when there is no response, the control circuit 36 determines that the communication state is the unconnected state. If it has been determined that the communication state is the connected state, then the control circuit 36 proceeds to the process of S440. On the other hand, if the communication state has been determined to be the unconnected state, then the control circuit 36 proceeds to the process of S470.

In S440, the control circuit 36 determines whether the second signal input to the TR terminal 44 is a discharge-permit signal. If the second signal is a discharge-permit signal, then the control circuit 36 sets a second permit flag in S450 and then proceeds to the process of S490. On the other hand, if the second signal is a discharge-prohibit signal, then the control circuit 36 clears the second permit flag in S460 and then proceeds to the process of S490.

In S470, the control circuit 36 determines whether the unconnected duration of the battery-control circuit 65 is longer than a determination time. Specifically, the control circuit 36 determines whether the determination time has elapsed since there has been no response after transmitting an information-request signal to the battery-control circuit 65. The determination time is a preset time. If the unconnected duration is longer than the determination time, then the control circuit 36 clears the second permit flag in S480 and then proceeds to the process of S490. Thereby, when serial communication with the battery-control circuit 65 is not established, the control circuit 36 performs the same process as in the situation in which a discharge-prohibit signal has been received via the TR terminal 44. On the other hand, if the unconnected duration is less than the determination time, then the control circuit 36 proceeds directly to the process of S490.

In S490, the control circuit 36 determines whether the first permit flag is set. If the first permit flag is set, then the control circuit 36 proceeds to the process of S500; on the other hand, if the first permit flag is not set, then the control circuit 36 proceeds to the process of S520.

In S500, the control circuit 36 determines whether the second permit flag is set. If the second permit flag is set, then the control circuit 36 proceeds to the process of S510; on the other hand, if the second permit flag is not set, then the control circuit 36 proceeds to the process of S520.

In S510, the control circuit 36 sets a discharge-permit flag. That is, the control circuit 36 sets the discharge-permit flag only in the situation in which both the first permit flag and the second permit flag are set. Thereby, discharging of the battery pack 22 is to be permitted only in the situation in which both the first and second signals indicate that discharging is to be permitted.

On the other hand, in S520, the control circuit 36 clears the discharge-permit flag. That is, when at least one of the first permit flag and the second permit flag is not set, the control circuit 36 clears the discharge-permit flag. Thereby, discharging of the battery pack 22 is to be prohibited in the situation in which at least one of the first and second signals indicates that discharging is to be prohibited. The present process ends with the above.

<4-4. Discharge-Abnormality Process>

Figure 7:
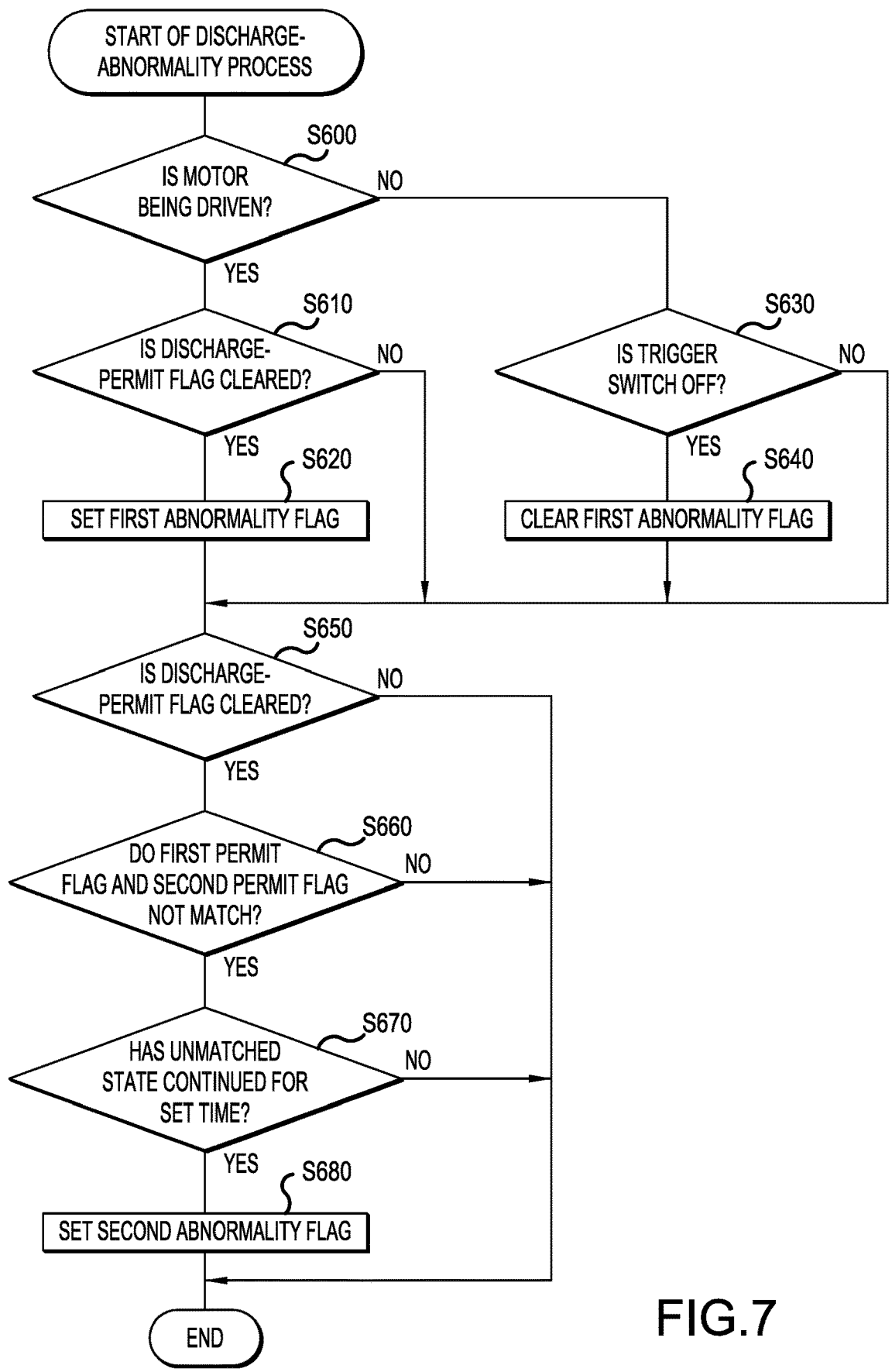
FIG. 7 is a flow chart of a discharge-abnormality process, according to the first embodiment, which is performed by the control circuit of the work machine.

Next, the details of the discharge-abnormality process, which is performed by the control circuit 36 in S320, will be explained, with reference to the flow chart in FIG. 7.

First, in S600, the control circuit 36 determines whether the motor 50 is being driven. If the motor 50 is being driven, then the control circuit 36 proceeds to the process of S610; on the other hand, if the motor 50 is stopped, then the control circuit 36 proceeds to the process of S630.

In S610, the control circuit 36 determines whether the discharge-permit flag is cleared. If the discharge-permit flag is cleared, then the control circuit 36 sets a first abnormality flag in S620 and then proceeds to the process of S650. On the other hand, if the discharge-permit flag is set, then the control circuit 36 proceeds directly to the process of S650.

In S630, the control circuit 36 determines whether the trigger switch 12 is OFF. If the trigger switch 12 is OFF, then the control circuit 36 clears the first abnormality flag in S640 and then proceeds to the process of S650. On the other hand, if the trigger switch 12 is ON, then the control circuit 36 proceeds directly to the process of S650.

In S650, the control circuit 36 determines whether the discharge-permit flag is cleared. If the discharge-permit flag is cleared, then the control circuit 36 proceeds to the process of S660. On the other hand, if the discharge-permit flag is set, then the control circuit 36 ends the present process.

In S660, the control circuit 36 determines whether the state of the first permit flag and the state of the second permit flag match. That is, the control circuit 36 determines whether both the first permit flag and the second permit flag are cleared. If one of the first permit flag and the second permit flag is set and the other is cleared (i.e. the two flag states do not match), then the control circuit 36 proceeds to the process of S670. On the other hand, if both the first permit flag and the second permit flag are cleared (i.e. the two flag states match), then the control circuit 36 ends the present process.

In S670, the control circuit 36 determines whether the unmatched state of the first permit flag and the second permit flag has continued for a set time or longer. The set time is set to the cycle with which the information-request signal is output or is set to a time that is longer than the cycle with which the information-request signal is output. If the point in time when the battery pack 22 entered the state requiring protection and the point in time when the information-request signal was output differ from one another, then a time period arises during which the first permit flag and the second permit flag enter the unmatched state. Nevertheless, when is no abnormality in the battery pack 22 and the controller 30, the duration of the unmatched state between the first permit flag and the second permit flag is less than the set time.

If the unmatched state continues for the set time or longer, then the control circuit 36 sets a second abnormality flag in S680 and then ends the present process. Even if the trigger switch 12 is turned ON once again, owing to the second abnormality flag being set, restarting of the motor 50 is prohibited in case one or more prescribed cancellation conditions is (are) not met. Prescribed cancellation condition (i) is the condition that the battery pack 22 is removed from the work machine 1. When the battery pack 22 is removed from the work machine 1 and the electric current from the battery pack 22 is thus no longer supplied to the control circuit 36, the prohibition of restarting of the motor 50 is cancelled. On the other hand, if the duration of the unmatched state is less than the set time, then the control circuit 36 directly ends the present process.

It is noted that, in addition to condition (i), the prescribed cancellation conditions may include condition (ii), which is the condition that the work machine 1 has not been operated for a prescribed time or longer, and condition (iii), which is the condition that the main switch 24 of the work machine 1 has been turned OFF. In an embodiment in which the prescribed cancellation conditions include the above-mentioned conditions (i)-(iii), then prohibition of restarting of the motor 50 is cancelled in response to any one of the conditions (i)-(iii) being met.

<4-5. Motor-Control Process>

Figure 8:
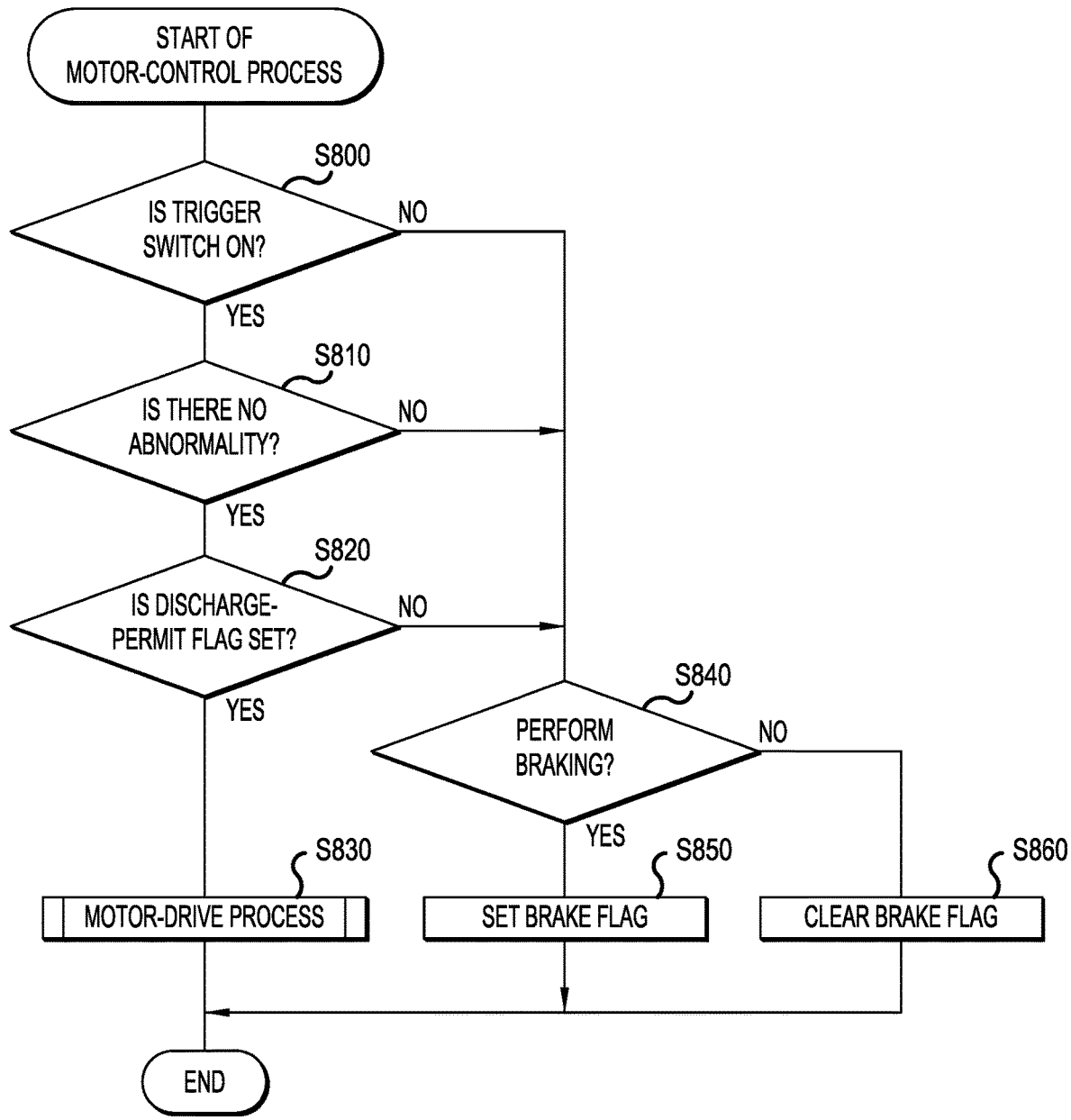
FIG. 8 is a flow chart of a motor-drive process, according to the first embodiment, which is performed by the control circuit of the work machine.

Next, the details of the motor-control process, which is performed by the control circuit 36 in S250, will be explained, with reference to the flow chart in FIG. 8.

First, in S800, the control circuit 36 determines whether the trigger switch 12 is ON. If the trigger switch 12 is ON, then the control circuit 36 proceeds to the process of S810; on the other hand, if the trigger switch 12 is OFF, then the control circuit 36 proceeds to the process of S840.

In S810, the control circuit 36 determines whether there is no abnormality in the motor 50, the controller 30, and the battery pack 22. Specifically, the control circuit 36 determines whether any one of the motor-abnormality flag, the first abnormality flag, and the second abnormality flag is set. If no abnormality flag is set, then the control circuit 36 proceeds to the process of S820. On the other hand, if any of the abnormality flags is set, then the control circuit 36 proceeds to the process of S840.

In S820, the control circuit 36 determines whether the discharge-permit flag is set. If the discharge-permit flag is set, then the control circuit 36 proceeds to the process of S830; on the other hand, if the discharge-permit flag is cleared, then the control circuit 36 proceeds to the process of S840.

In S830, the control circuit 36 receives the supply of electric power from the battery 60 and performs a motor-drive process. In greater detail, the control circuit 36 calculates the rotational position and the rotational speed of the rotor of the motor 50 based on rotation-detection signals from the rotation sensor 52. In addition, the control circuit 36 sets a target rotational speed of the rotor of the motor 50 based on the setting (rotational position) of the speed-changing dial 23 and sets the rotational direction of the rotor of the motor 50 based on the setting (lateral position) of the forward/reverse-changing switch 9. Furthermore, the control circuit 36 calculates, using the calculated rotational speed of the rotor of the motor 50, a pulse-width modulation (PWM) duty ratio for each switching device of the drive circuit 32 such that the rotational speed of the rotor the motor 50 in the set rotational direction converges to the target rotational speed. Furthermore, the control circuit 36 outputs, to the gate circuit 34, control signals corresponding to the calculated PWM duty ratios and then ends the present process.

On the other hand, in S840, the control circuit 36 determines whether to perform braking control (short-circuit braking). Specifically, if the motor 50 is rotating and there will be no effect on the controller 30 even if the motor 50 is caused to generate a braking force, then the control circuit 36 determines that braking control is to be performed. In this situation, the control circuit 36 sets a brake flag in S850 and then ends the present process. Thereby, the supply of electric power from the battery 60 to the motor 50 is stopped, and short-circuit braking is performed.

On the other hand, if the motor 50 is not rotating or if there would be an effect on the controller 30 in case the motor 50 is rotating and the motor 50 is caused to generate a braking force, then the control circuit 36 determines that braking control is not to be performed. In this situation, the control circuit 36 clears the brake flag in S860 and then ends the present process. Thereby, the supply of electric power from the battery 60 to the motor 50 is stopped. Furthermore, if the motor 50 is rotating, free running (inertial rotating) of the rotor of the motor 50 is permitted.

<5. Effects>

According to the first embodiment as explained above, the following effects are obtained.

(1) The work machine 1 comprises the DS terminal 43, which receives the first signal, and the TR terminal 44, which receives the second signal. Consequently, even if a malfunction has occurred wherein a signal indicating that discharging is to be permitted is received via one of the DS terminal 43 or the TR terminal 44 even though first and second signals that indicate discharging is to be prohibited have been transmitted from the battery pack 22, the work machine 1 can still receive, via the other terminal, a signal indicating that discharging is to be prohibited. Thereby, the battery pack 22 is properly protected and deterioration of the battery pack 22 can be curtailed.

(2) The second signal is input using the TR terminal 44, to which a battery signal, other than a signal indicating that discharging is to be permitted or prohibited, is input. Thereby, the work machine 1 receives the first and second signals from the battery pack 22 and can doubly protect the battery pack 22 without increasing the number of terminals. In addition, the battery pack 22 can transmit the first and second signals to the work machine 1 without increasing the number of terminals.

(3) When the battery pack 22 has entered the discharge-prohibited state, the work machine 1 can receive a discharge-prohibit signal via the DS terminal 43 in real time. In addition, in response to an information-request signal transmitted by itself, the work machine 1 can receive a second signal based on the state of the battery pack 22. That is, in the event that the battery pack 22 has entered the discharge-prohibited state when an information-request signal has been received, the work machine 1 can receive the discharge-prohibit signal via the TR terminal 44.

(4) When the DS terminal 43 is not connected to the battery pack 22, the work machine 1 receives the discharge-prohibit signal via the DS terminal 43. Thereby, when the DS terminal 43 is not connected to the battery pack 22, the work machine 1 stops the discharging of the battery pack 22 and thereby can protect the battery pack 22.

(5) The work machine 1 can receive a plurality of battery signals via the TR terminal 44. Furthermore, while serial communication is not established between the work machine 1 and the battery pack 22, the work machine 1 performs the same process as in the situation in which a discharge-prohibit signal has been received via the TR terminal 44. Thereby, while serial communication is not established between the work machine 1 and the battery pack 22, the work machine 1 stops the discharging of the battery pack 22 and thereby can protect the battery pack 22.

(6) With regard to the work machine 1, when a discharge current is not flowing from the battery pack 22 to the work machine 1 (i.e. a battery-idle state), the state of the battery 60 changes significantly less than when a discharge current is flowing. Thereby, when a discharge current is not flowing from the battery pack 22 to the work machine 1, the frequency of serial communication is controlled (set) to be lower than when a discharge current is flowing. Thereby, the load on the control circuit 36 and the battery-control circuit 65 of the work machine 1 can be curtailed in the battery-idle state.

(7) Even though the control circuit 36 has received a discharge-prohibit signal from one from among the DS terminal 43 and the TR terminal 44, if the control circuit 36 has not received a discharge-prohibit signal from the other, then there is a possibility that an abnormality has occurred. Thereby, in this situation, the work machine 1 can protect the battery pack 22 by prohibiting restarting of the motor 50, even if the trigger 11 is manipulated (pulled), as long as the prescribed conditions are not satisfied.

(8) The DS-connection path and the serial-connection path are separate, independent paths having no common portion. Accordingly, the battery pack 22 can be doubly protected in a reliable manner.

(9) The motor 50 is driven only in the situation in which the control circuit 36 receives a discharge-permit signal via the DS terminal 43 and receives a discharge-permit signal via the TR terminal 44. Accordingly, regardless of whether the first and second signals that indicate discharging is to be prohibited have been output from the battery pack 22, the battery pack 22 can still be protected even in the situation in which a discharge-permit signal is received at only one of the DS terminal 43 and the TR terminal 44.

Second Embodiment

<2-1. Points of Difference from the First Embodiment>

Next, because the basic configuration of the second embodiment is the same as that of the first embodiment, explanations of structural elements that are in common will be omitted, and the second embodiment will be explained focusing on the points of difference. It is noted that symbols that are the same as those in the first embodiment indicate identical structural elements, and preceding explanations will be referenced.

In the first embodiment, when the battery pack 22 has entered the state in which it should be protected, two types of discharge-prohibit signals are transmitted from the battery DS terminal 63 and the battery TR terminal 64 to the controller 30 of the work machine 1. In contrast, the second embodiment differs from the first embodiment in the point that, when the battery pack 22 has entered the state in which it should be protected, three types of discharge-prohibit signals are transmitted from the battery DS terminal 63 and the battery TR terminal 64 to the controller 30 of the work machine 1. In addition, in the second embodiment, the battery-control circuit 65 and the controller 30 perform half-duplex serial communication in which the battery-control circuit 65 is the master and the controller 30 is the slave.

<2-2. Configuration of Motor-Control System>

Figure 9:
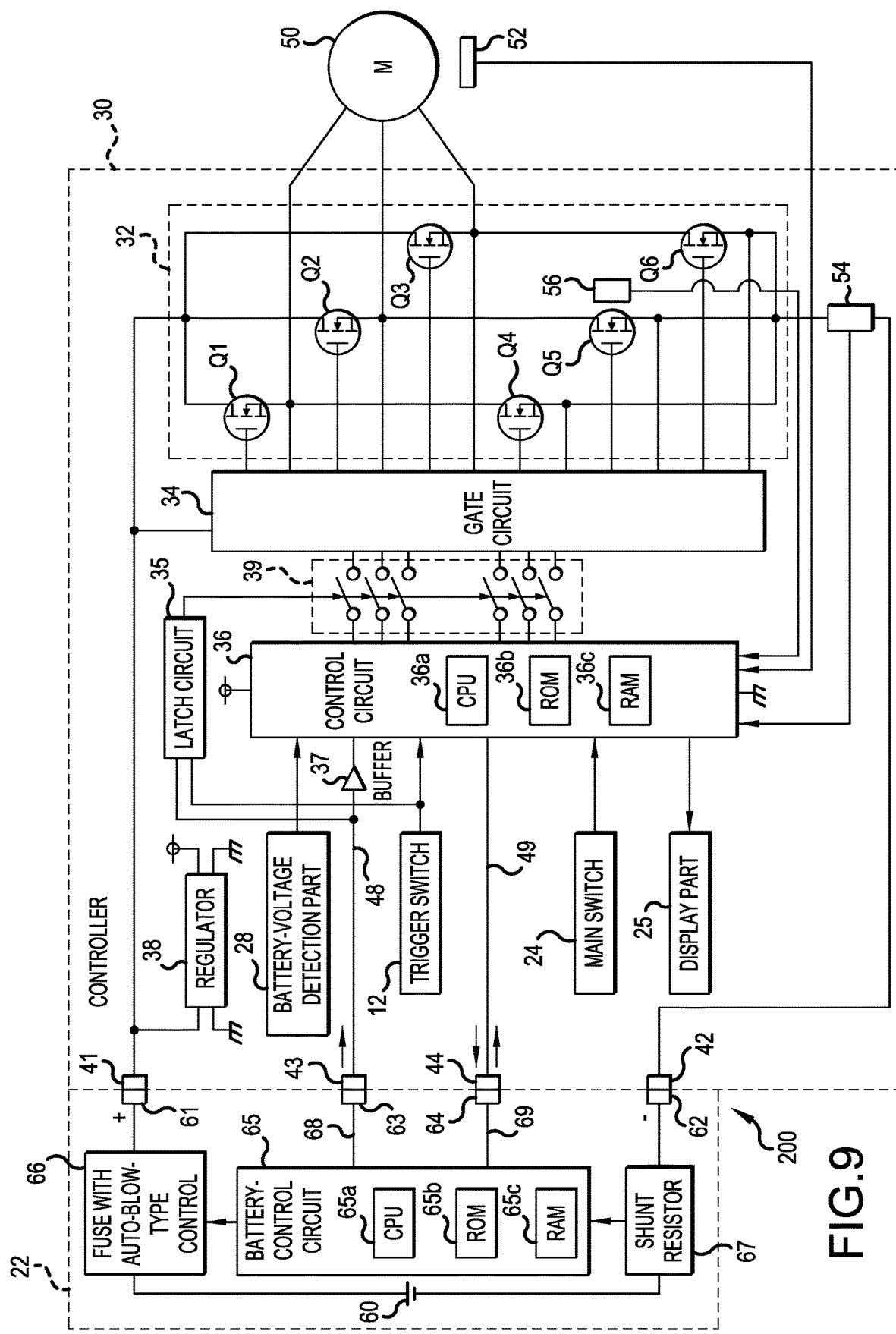
FIG. 9 is a block diagram of the configuration of a motor-control system according to a second embodiment.

Next, the configuration of a motor-control system 200 according to the second embodiment will be explained, with reference to FIG. 9.

The motor-control system 200 comprises, in addition to the structural elements of the motor-control system 100, a fuse 66 with auto-blow control (hereinbelow, fuse 66), a shunt resistor 67, a latch circuit 35, a buffer 37, and a stop circuit 39.

The fuse 66 and the shunt resistor 67 are provided inside the battery pack 22. The fuse 66 is provided along (in series with) a positive-electrode line, which connects the positive electrode of the battery 60 and the battery positive-electrode terminal 61. The shunt resistor 67 is provided along (in series with) a negative-electrode line, which connects the negative electrode of the battery 60 and the battery negative-electrode terminal 62.

If discharging does not stop even though three types of discharge-prohibit signals are output from the battery pack 22, as a last means to ensure safety, then the battery-control circuit 65 outputs an instruction to blow the fuse 66. When the fuse 66 is blown, the positive-electrode line is disconnected and the battery 60 enters the state in which it is not operable (it becomes incapable of supplying electric charge to the controller 30). In addition, the battery-control circuit 65 detects, via the shunt resistor 67, the discharge current and the charge current flowing through the battery 60. In the present embodiment, the shunt resistor 67 corresponds to one example of a detecting part.

The latch circuit 35, the stop circuit 39, and the buffer 37 are provided in the controller 30 of the work machine 1. The latch circuit 35 comprises two input terminals and one output terminal. The first input terminal is connected to the first connection wire 48. The second input terminal is connected to a connection wire that connects a trigger switch (hereinafter, "trigger SW") 12 and the control circuit 36. In addition, the output terminal is connected to the stop circuit 39.

The stop circuit 39 is provided along (in series with) six output paths for outputting three phases of motor-control signals from the control circuit 36 to the gate circuit 34. The stop circuit 39 comprises switch devices, which are provided along (in series with) the six output paths, respectively. The buffer 37 is provided along (in series with) the first connection wire 48. In greater detail, the buffer 37 is provided between the control circuit 36 and the connection point between the first input terminal of the latch circuit 35 and the first connection wire 48.

When a discharge-permit signal is input from the first input terminal and an ON signal of the trigger SW 12 is input from the second input terminal, the latch circuit 35 outputs a signal to turn ON the switch devices of the stop circuit 39. On the other hand, when a discharge-prohibit signal is input from the first input terminal while the latch circuit 35 is outputting the signal to turn ON each switch device of the stop circuit 39, the latch circuit 35 switches to outputting a signal to latch each switch device of the stop circuit 39 to OFF until an OFF signal of the trigger SW 12 is input from the second input terminal. That is, in response to a discharge-prohibit signal having been input, the latch circuit 35 maintains the discharge-prohibited state until the trigger SW 12 turns OFF. Thereby, even if the discharge-prohibit signal that has been input from the DS terminal 43 disappears owing to a malfunction or the like of the battery-control circuit 65, a sudden startup of the motor 50 can be inhibited.

The buffer 37 transmits signals in one direction, i.e. from the DS terminal 43 to the control circuit 36. In an embodiment in which the buffer 37 were not to be provided, there is a possibility that the control circuit 36 will run out of control and thereby output a discharge-permit signal from the control circuit 36 to the first input terminal of the latch circuit 35. In turn, there is a possibility that the switch devices of the stop circuit 39 will be turned ON mistakenly. By providing the buffer 37 between the control circuit 36 and the connection point between the first input terminal of the latch circuit 35 and the first connection wire 48, the discharge-permit signal will not be input to the first input terminal of the latch circuit 35 even in the event that a discharge-permit signal is mistakenly output from the control circuit 36. In turn, it is possible to avoid the situation in which the switches of the stop circuit 39 are turned ON mistakenly.

<2-3. Discharge-Control Process>

Next, the discharge-control process, which is performed by the battery-control circuit 65, will be explained, with reference to the flow chart in FIG. 10.

First, in S15, it is determined whether the battery 60 is in an overdischarged state. In S15, if it is determined that the battery 60 is not in the overdischarged state, then it proceeds to S25, whereupon a discharge-permit signal (specifically, a Lo signal) is transmitted to the work machine 1 via the battery DS terminal 63. Subsequently, it proceeds to the process of S35.

In S35, it is determined whether the work machine 1 is unconnected from the battery pack 22. If the work machine 1 is unconnected, then the present process ends. On the other hand, if the work machine 1 is connected to the battery pack, then it returns to the process of S15.

In S15, if it is determined that the battery 60 is in the overdischarged state, then in S45 a discharge-prohibit signal that complies with the communication protocol is transmitted to the controller 30 by serial communication via the battery TR terminal 64 and thereby a request is issued to the controller 30 to stop the discharging. The discharge-prohibit signal transmitted in S45 is a multibit binary signal, in which each bit is indicated, in accordance with the communication protocol, by either a Hi signal, in which the voltage is at a Hi level, or a Lo signal, in which the voltage is at a Lo level. It is noted that, in the present embodiment, the discharge-prohibit signal transmitted in S45 corresponds to one example of a third signal.

Then, in S55, it is determined whether, after an overdischarged state has been detected, the overdischarged state has continued for a time TA1. That is, it is determined whether the overdischarged state is continuing even though a request was issued in S45 to stop discharging. TA1 is, for example, 0.5 s. In S55, if it is determined that it has not continued for the time TA1, then it proceeds to the process of S25. On the other hand, in S55, if it is determined that it has continued for the time TA1, then it proceeds to the process of S65.

In S65, a discharge-prohibit signal that does not comply with the communication protocol is transmitted to the controller 30 via the battery TR terminal 64. The discharge-prohibit signal that does not comply with the communication protocol is a signal in which the voltage level is fixed, a signal in which the cycle is set higher than the normal clock signal, a random signal, or the like.

In the present embodiment, a signal in which the voltage level is fixed is used as the discharge-prohibit signal that does not comply with the communication protocol. In greater detail, the battery TR terminal 64 outputs either one of a Hi signal or a Lo signal and outputs a Lo signal when the serial communication is on standby. That is, the voltage level of the battery TR terminal 64 is fixed to the Lo level when the serial communication is on standby. In contrast, during output of the signal that does not comply with the communication protocol, the voltage level of the battery TR terminal 64 is fixed to the Hi level. The discharge-prohibit signal that does not comply with the communication protocol is a signal that is composed of a continuous Hi signal.

When the battery 60 is overloaded, noise tends to be superimposed on the serial communication. By outputting the discharge-prohibit signal as a signal in which the voltage is fixed to a constant voltage level, noise tolerance is improved, and thereby the discharge-prohibit signal can be transmitted with higher reliability to the controller 30. It is noted that the voltage level of the battery TR terminal 64 may be fixed at the Hi level when serial communication is on standby and may be fixed at the Lo level during output of the discharge-prohibit signal that does not comply with the communication protocol. That is, the discharge-prohibit signal that does not comply with the communication protocol may be a signal that is composed of a continuous Lo signal. In the present embodiment, the discharge-prohibit signal that is transmitted in S55 corresponds to one example of a fourth signal.

Then, in S75, it is determined whether, even after the discharge-prohibit signal (specifically, a Hi signal) that does not comply with the communication protocol has been transmitted via the battery TR terminal 64 in S65, the discharge current is continuing to flow for a time TB1 or longer. TB1 is, for example, 0.5 s.

In S75, if it is determined that the discharge current is not continuing to flow, then it proceeds to the process of S25. On the other hand, if it is determined in S75 that the discharge current is continuing to flow, then it proceeds to the process of S85.

In S85, the discharge-prohibit signal is transmitted to the controller 30 via the battery DS terminal 63. In greater detail, the battery DS terminal 63 is set to a high-impedance state.

Then, in S95, it is determined whether, even after the discharge-prohibit signal has been transmitted via the battery DS terminal 63 in S85, the discharge current is continuing for a time TC1 or longer. TC1 is, for example, 0.75 s.

In S95, if it is determined that the discharge current is not continuing to flow, then it proceeds to the process of S35. On the other hand, if it is determined in S95 that the discharge current is continuing to flow, then it proceeds to the process of S105.

In S105, an instruction to blow the fuse 66 is output, and thereby the fuse 66 is blown. Thereby, discharging from the battery 60 stops. The present process ends with the above.

<2-4. Discharge-Prohibit Operation>

Figure 10:
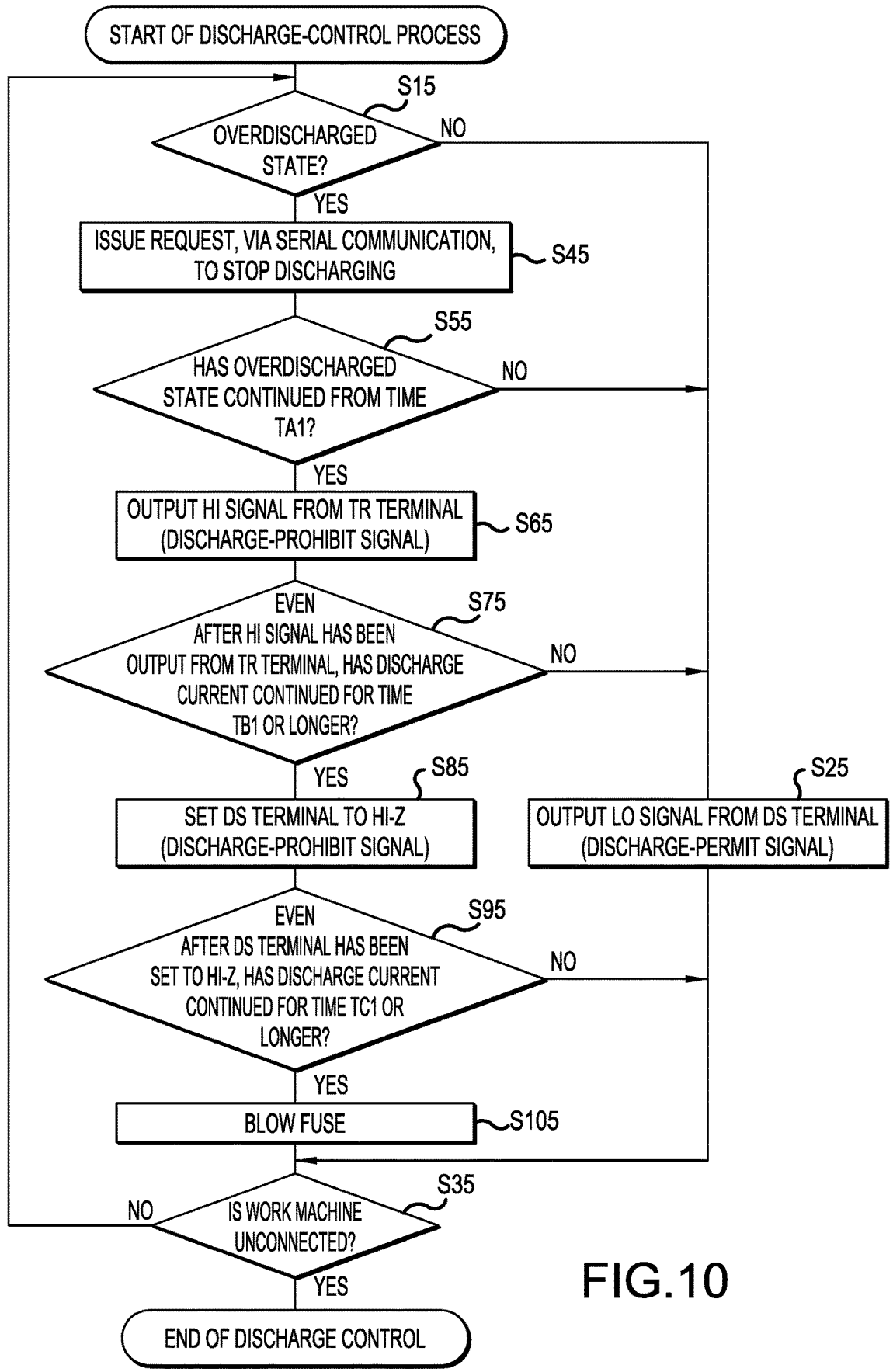
FIG. 10 is a flow chart of the procedure of a discharge-control process according to the second embodiment.
Figure 11:
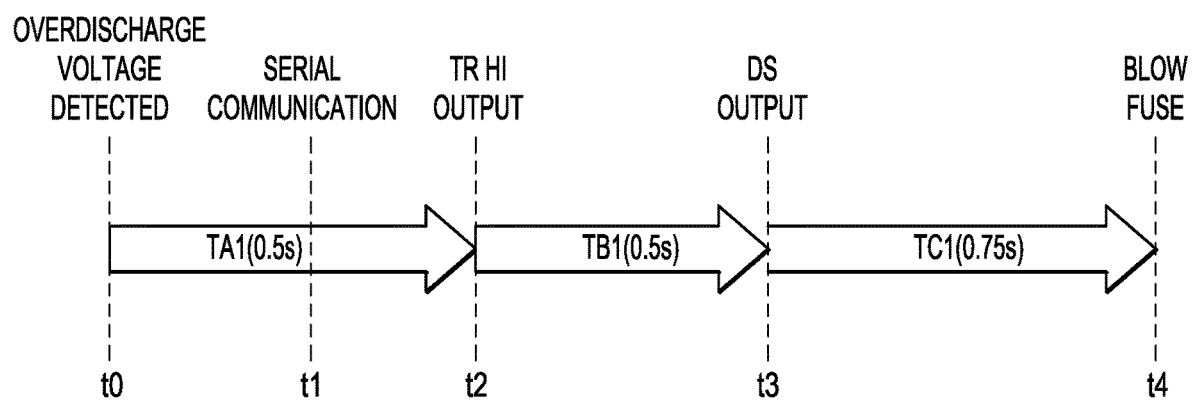
FIG. 11 is an explanatory diagram that shows output processes of three types of discharge-prohibit signals according to the second embodiment.

FIG. 11 shows a discharge-prohibit operation in an embodiment in which the flow chart shown in FIG. 10 is performed. First, when an overdischarge voltage is detected at the point in time t0, a discharge-prohibit signal is transmitted by serial communication at the point in time t1 from the battery-control circuit 65 to the controller 30. That is, in response to the battery pack 22 having entered the state in which it should be protected, first, a discharge-prohibit signal is transmitted by serial communication. Upon receiving the discharge-prohibit signal by serial communication, the controller 30 identifies the overdischarged state of the battery pack 22 and thereby can take appropriate action.

Then, at the point in time t2 at which the time TA1 since the point in time t0 has elapsed, if the overdischarged state has not been resolved, a discharge-prohibit signal in which the voltage level is fixed to the Hi level is transmitted via the battery TR terminal 64. If the overdischarged state of the battery 60 still cannot be resolved even though the discharge-prohibit signal was transmitted by serial communication, there is a possibility that noise is superimposed on the serial communication, and thereby the controller 30 is not able to receive the discharge-prohibit signal, i.e. the discharge-prohibit signal is corrupted by the noise superimposed thereon. In response thereto, a discharge-prohibit signal that has strong noise tolerance is then transmitted.

Then, at the point in time t3 at which the time TB1 since the point in time t2 has elapsed, if discharging still has not stopped, then a discharge-prohibit signal is transmitted via the battery DS terminal 63. When the discharge-prohibit signal is input from the battery DS terminal 63 to the latch circuit 35 via the DS terminal 43, the switches of the stop circuit 39 turn OFF. As a result, the discharge-prohibited state is maintained as long as the prescribed condition(s) is/are not satisfied. Accordingly, of the three types of discharge-prohibit signals, the discharge-prohibit signal that transits the battery DS terminal 63 is transmitted last.

Then, at the point in time t4 at which the time TC1 since the point in time t3 has elapsed, if the discharging still has not stopped, then the fuse 66 is blown. That is, if the discharging of the battery 60 cannot be stopped even though the three types of discharge-prohibit signals are transmitted from the battery-control circuit 65 to the controller 30, then the fuse 66 is blown as a means of last resort.

According to the second embodiment as explained above, the following effects are exhibited in addition to the effects (1)-(9) of the first embodiment.

(10) A discharge-prohibit signal is transmitted from the battery-control circuit 65 to the controller 30 via the battery DS terminal 63. In addition, a discharge-prohibit signal that complies with the communication protocol and a discharge-prohibit signal that does not comply with the communication protocol are transmitted from the battery-control circuit 65 to the controller 30 via the battery TR terminal 64. Thereby, it becomes possible to transmit a total of three types of discharge-prohibit signals from the battery-control circuit 65 to the controller 30. Accordingly, the battery pack 22 receives proper protection and deterioration of the battery pack 22 can be curtailed.

(11) A signal in which the voltage level is fixed to the Hi level is continuously transmitted, as the signal that does not comply with the communication protocol, from the battery TR terminal 64. The noise tolerance of a signal in which the voltage level is fixed is higher than that of a signal whose voltage level fluctuates. Thereby, by outputting a multibit discharge-prohibit signal, in which the voltage level is fixed, during overdischarge of the battery 60, which is when noise tends to become superimposed, the reliability with which the discharge-prohibit signal is received by the controller 30 can be increased.

(12) In response to the battery 60 having entered the overdischarged state, first, a discharge-prohibit signal is transmitted by serial communication from the battery TR terminal 64. Thereby, before discharging stops, the controller 30 identifies the overdischarged state of the battery pack 22 and thereby can take action in accordance with the state of the battery pack 22.

(13) In response to the battery 60 having entered the state in which it should be protected, first, a discharge-prohibit signal is transmitted via the battery TR terminal 64, which is not connected to the latch circuit 35. Thereby, a sudden startup of the work machine 1 can be avoided while curtailing the processing load of the battery-control circuit 65 and the controller 30 attendant with releasing the latch circuit 35.

(14) If the discharge current continues to flow even though the three types of discharge-prohibit signals are transmitted from the battery-control circuit 65 to the controller 30, then the fuse 66 is blown. Thereby, in the event that discharging cannot be stopped when the battery pack is in the operable state, the battery pack 22 is placed into the inoperable state, and thereby the safety of the battery pack can be ensured.

Third Embodiment

<3-1. Points of Difference from the Second Embodiment>

Next, because the basic configuration of the third embodiment is the same as that of the second embodiment, explanations of structural elements that are in common will be omitted, and the third embodiment will be explained focusing on the points of difference. It is noted that symbols that are the same as those in the second embodiment indicate identical structural elements, and preceding explanations will be referenced.

In the third embodiment, the order in which the three types of discharge-prohibit signals are output differs from that of the second embodiment. In addition, in the third embodiment, the battery-control circuit 65 and the controller 30 perform half-duplex serial communication in which the battery-control circuit 65 is the slave and the controller 30 is the master. The configuration of the motor-control system 200 according to the third embodiment is the same as that of the second embodiment.

<3-2. Discharge-Control Process>

Next, the discharge-control process, which is performed by the battery-control circuit 65, will be explained, with reference to the flow chart in FIG. 12.

First, in S205, it is determined whether the battery 60 is in an overdischarged state. In S205, if it is determined that the battery 60 is not in the overdischarged state, then it proceeds to S215, whereupon a discharge-permit signal (specifically, a Lo signal) is transmitted to the work machine 1 via the battery DS terminal 63. Subsequently, it proceeds to the process of S225.

In S225, it is determined whether the work machine 1 is unconnected from the battery pack 22. If the work machine 1 is unconnected, then the present process ends. On the other hand, if the work machine 1 is connected to the battery pack, then it returns to the process of S205.

In S205, if it has been determined that the battery 60 is in the overdischarged state, then it is determined in S235 whether a serial-communication request is being received from the controller 30 via the battery TR terminal 64. In S235, if it has been determined that a serial-communication request is being received, then it proceeds to the process of S245. In the other hand, if it is determined in S235 that a serial-communication request is not being received, then it skips the process of S245 and proceeds to the process of S255.

In S245, a discharge-prohibit signal that complies with the communication protocol is transmitted by serial communication via the battery TR terminal 64, and thereby a request to stop discharging is issued to the controller 30. The discharge-prohibit signal that complies with the communication protocol is the same signal as that of the second embodiment.

Then, in S255, it is determined whether, after the overdischarged state was detected, the overdischarged state has continued for a time TA2. TA2 is, for example, 0.5 s. In S255, if it is determined that it has not continued for the time TA2, then it proceeds to the process of S215. On the other hand, if it is determined in S255 that it has continued for the time TA2, then it proceeds to the process of S265.

In S265, the battery DS terminal 63 is set to the high-impedance state, and thereby a discharge-prohibit signal is transmitted to the controller 30 via the battery DS terminal 63.

Then, in S275, it is determined whether, even after the discharge-prohibit signal was transmitted via the battery DS terminal 63 in S265, the discharge current is continuing to flow for a time TB2 or longer. TB2 is, for example, 0.25 s.

In S275, if it is determined that the discharge current is not continuing to flow, then it proceeds to the process of S225. On the other hand, if it is determined in S275 that the discharge current is still continuing to flow, then it proceeds to the process of S285.

In S285, a discharge-prohibit signal that does not comply with the communication protocol is transmitted to the controller 30 via the battery TR terminal 64. The discharge-prohibit signal that does not comply with the communication protocol is the same signal as that of the second embodiment.

Then, in S295, it is determined whether, even after the discharge-prohibit signal that does not comply with the communication protocol was transmitted via the battery TR terminal 64 in S285, the discharge current has continued to flow for a time TC2 or longer. TC2 is, for example, 0.75 s.

In S295, if it is determined that the discharge current is not continuing to flow, then it proceeds to the process of S225. On the other hand, if it is determined in S295 that the discharge current is still continuing to flow, then it proceeds to the process of S305.

In S305, an instruction to blow the fuse 66 is output, and thereby the fuse 66 is blown. Thereby, discharging from the battery 60 stops. The present process ends with the above.

<3-3. Discharge-Prohibit Operation>

Figure 12:
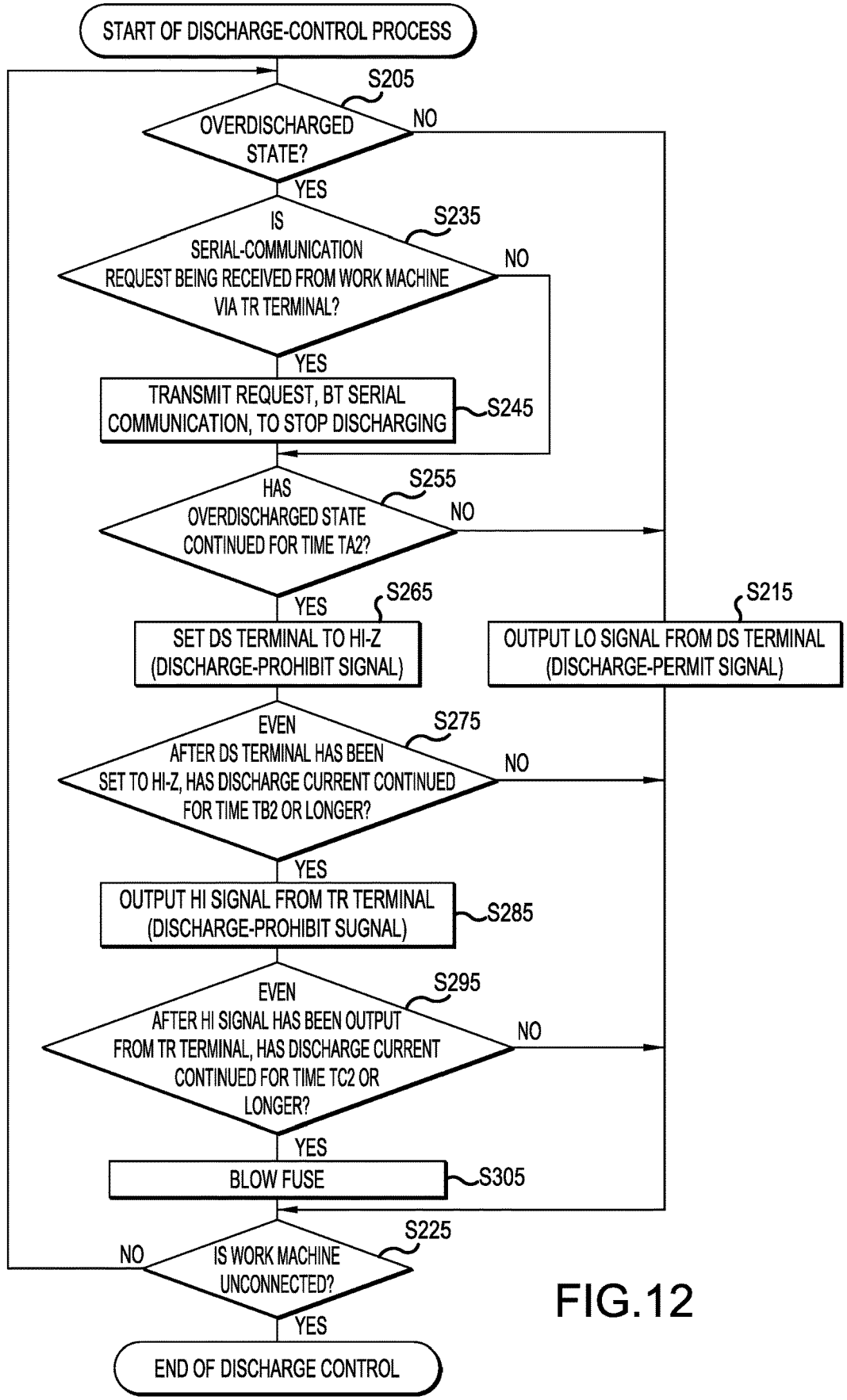
FIG. 12 is a flow chart of the procedure of the discharge-control process according to a third embodiment.
Figure 13:
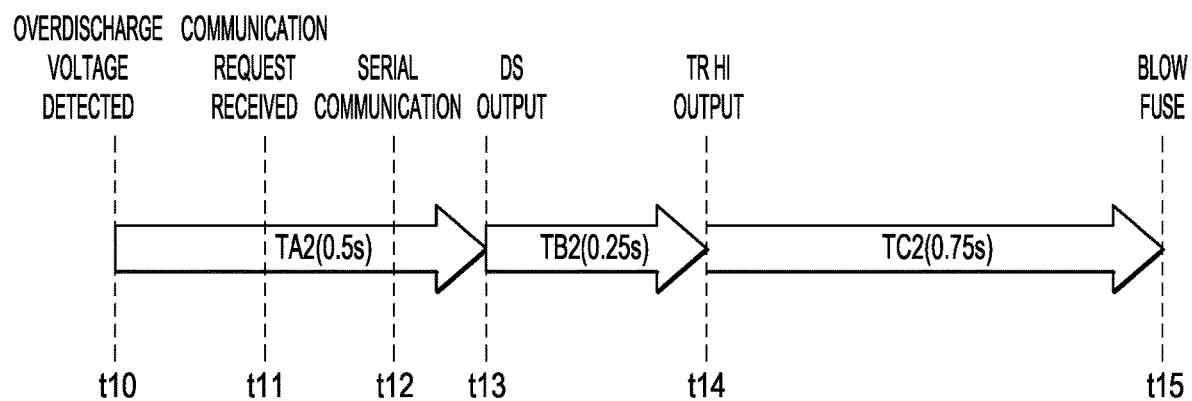
FIG. 13 is an explanatory diagram that shows output processes of three types of discharge-prohibit signals according to the third embodiment.

FIG. 13 shows a discharge-prohibit operation in an embodiment in which the flow chart shown in FIG. 12 is performed. First, an overdischarge voltage is detected at the point in time t10. At the point in time t11, when the battery-control circuit 65 receives a communication request from the controller 30, a discharge-prohibit signal is output by serial communication at a point in time t12 from the battery-control circuit 65 to the controller 30.

Then, at the point in time t13 at which the time TA2 since the point in time t10 has elapsed, if the overdischarged state has not been resolved, then a discharge-prohibit signal is transmitted via the battery DS terminal 63. Serial communication between the battery-control circuit 65 and the controller 30 is performed periodically. Consequently, in the interval from the point in time t10 to the point in time t13, there is also a possibility of a situation in which, owing to communication timing, the battery-control circuit 65 does not receive a communication request. In this situation, the discharge-prohibit signal, from among the three types of discharge-prohibit signals, that transits the battery DS terminal 63 is transmitted first.

Then, at the point in time t14 at which the time TB2 since the point in time t13 has elapsed, if which discharging still has not stopped, a discharge-prohibit signal that does not comply with the protocol is transmitted via the battery TR terminal 64. Then, at the point in time t15 at which the time TC2 since the point in time t14 has elapsed, if discharging still has not stopped, then the fuse 66 is blown.

According to the third embodiment as explained above, the effects (1)-(9) of the first embodiment and the effects (10), (11), and (14) of the second embodiment are exhibited. In addition, in an embodiment in which a discharge-prohibit signal has been transmitted by serial communication via the battery TR terminal 64 before a discharge-prohibit signal is transmitted via the battery DS terminal 63, the effects (12) and (13) of the second embodiment are exhibited.

Fourth Embodiment

<4-1. Points of Difference from the Second Embodiment>

Next, because the basic configuration of the fourth embodiment is the same as that of the second embodiment, explanations of structural elements that are in common will be omitted, and the fourth embodiment will be explained focusing on the points of difference. It is noted that symbols that are the same as those in the second embodiment indicate identical structural elements, and preceding explanations will be referenced.

In the fourth embodiment, the order in which the three types of discharge-prohibit signals are output differs from that of the second embodiment. In addition, in the fourth embodiment, the battery-control circuit 65 and the controller 30 perform half-duplex serial communication in which the battery-control circuit 65 is the slave and the controller 30 is the master. The configuration of the motor-control system 200 according to the fourth embodiment is the same as that of the second embodiment.

<4-2. Discharge-Control Process>

Next, the discharge-control process, which is performed by the battery-control circuit 65, will be explained, with reference to the flow chart in FIG. 14.

First, in S405, it is determined whether the battery 60 is in an overdischarged state. In S405, if it is determined that the battery 60 is not in the overdischarged state, then it proceeds to S415, whereupon a discharge-permit signal (specifically, a Lo signal) is transmitted to the work machine 1 via the battery DS terminal 63. Subsequently, it proceeds to the process of S425.

In S425, it is determined whether the work machine 1 is unconnected from the battery pack 22. If the work machine 1 is unconnected, then the present process ends. On the other hand, if the work machine 1 is connected to the battery pack, it returns to the process of S405.

In S405, if it is determined that the battery 60 is in the overdischarged state, then it proceeds to the process of S435. In S435, the battery DS terminal 63 is set to the high-impedance state, and thereby a discharge-prohibit signal is transmitted to the controller 30 via the battery DS terminal 63.

Then, in S445, it is determined whether a serial-communication request has been received from the controller 30 via the battery TR terminal 64. In S445, if it has been determined that a serial-communication request has been received, then it proceeds to the process of S455. On the other hand, if it has been determined in S445 that a serial-communication request has not been received, then it skips the process of S455 and proceeds to S465.

In S465, it is determined whether, even after the discharge-prohibit signal was transmitted via the battery DS terminal 63 in S435, the discharge current is continuing to flow for a time TA3 or longer. TA3 is, for example, 0.75 s.

In S465, if it is determined that the discharge current is not continuing to flow, then it proceeds to the process of S425. On the other hand, if it is determined in S465 that the discharge current is still continuing to flow, then it proceeds to the process of S475.

In S475, a discharge-prohibit signal that does not comply with the communication protocol is transmitted to the controller 30 via the battery TR terminal 64. The discharge-prohibit signal that does not comply with the communication protocol is the same signal as that of the second embodiment.

Then, in S485, it is determined whether, even after the discharge-prohibit signal that does not comply with the communication protocol was transmitted via the battery TR terminal 64 in S475, the discharge current has continued to flow for a time TB3 or longer. TB3 is, for example, 0.75 s.

In S485, if it is determined that the discharge current is not continuing to flow, then it proceeds to the process of S425. On the other hand, if it is determined in S485 that the discharge current is still continuing to flow, then it proceeds to the process of S495.

In S495, an instruction to blow the fuse 66 is output, and thereby the fuse 66 is blown. Thereby, discharging from the battery 60 stops. The present process ends with the above.

<4-3. Discharge-Prohibit Operation>

Figure 14:
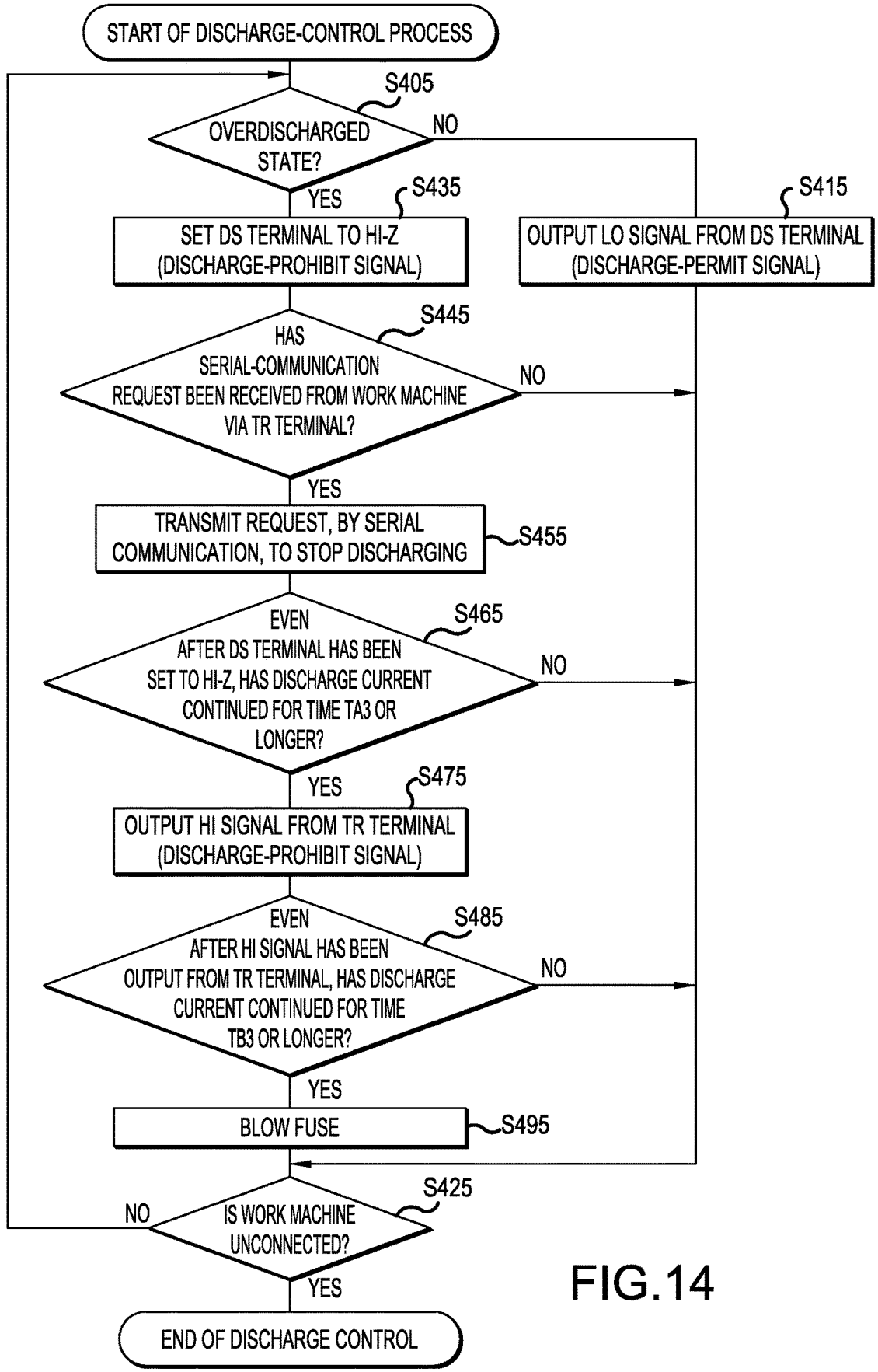
FIG. 14 is a flow chart of the procedure of the discharge-control process according to a fourth embodiment.
Figure 15:
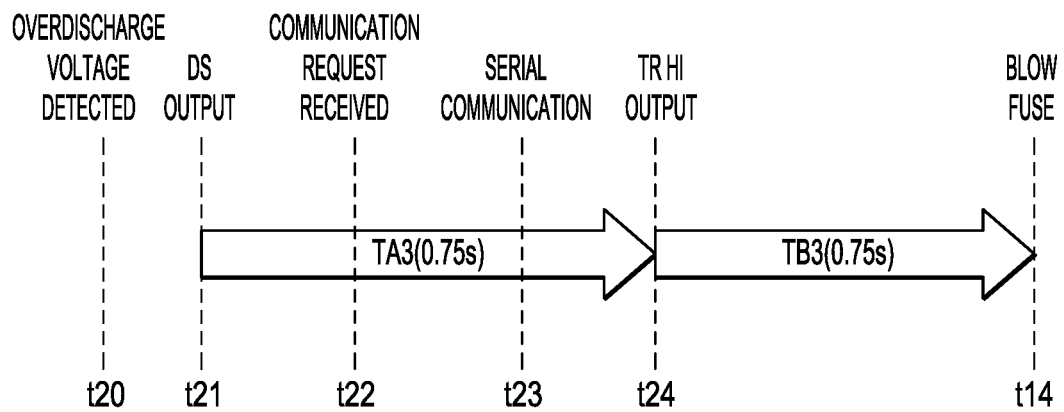
FIG. 15 is an explanatory diagram that shows output processes of three types of discharge-prohibit signals according to the fourth embodiment.

FIG. 15 shows a discharge-prohibit operation in an embodiment in which the flow chart shown in FIG. 14 is performed. First, when an overdischarge voltage is detected at the point in time t20, a discharge-prohibit signal is transmitted via the battery-DS terminal 63 at the point in time t21. In the present embodiment, because the battery-control circuit 65 is the slave, the discharge-prohibit signal cannot be received by serial communication until the battery-control circuit 65 receives a communication request from the controller 30. Accordingly, there is a possibility that a time lag will arise from when the overcharge voltage is detected until the discharge-prohibit signal is transmitted by serial communication. Therefore, by first outputting a discharge-prohibit signal via the battery-DS terminal 63, discharging can be quickly stopped.

Then, when the battery-control circuit 65 receives a communication request from the controller 30 at the point in time t22, a discharge-prohibit signal is output at the point in time t23 by serial communication from the battery-control circuit 65 to the controller 30.

Then, at the point in time t24 at which the time TA3 since the point in time t21 has elapsed, if discharging still has not stopped, a discharge-prohibit signal that does not comply with the protocol is transmitted via the battery TR terminal 64. It is noted that there is also the possibility of the situation in which, owing to the communication timing between the battery-control circuit 65 and the controller 30, the battery-control circuit 65 does not receive a communication request in the interval from the point in time t21 to the point in time t24. Then, at the point in time t25 at which the time TB3 since the point in time t24 has elapsed, if discharging still has not stopped, then the fuse 66 is blown.

According to the third embodiment as explained above, the effects (1)-(9) of the first embodiment and the effects (10), (11), and (14) of the second embodiment are exhibited. Furthermore, when an overdischarge voltage of the battery 60 is detected, it is possible to quickly stop the discharging by immediately transmitting a discharge-prohibit signal from the battery DS terminal 63.

Other Embodiments

Modes (embodiments) for carrying out the present disclosure were explained above, but the present disclosure is not limited to the embodiments described above, and various modifications can be effected.

(a) The present disclosure is not limited to being applied to a grass trimmer and is applicable to a variety of work machines that are configured such that a work tool is driven by a rotational force, for example, power tools such as chain saws, hedge trimmers, clippers, impact drivers, and the like.

(b) The control circuit 36 and the battery-control circuit 65 may comprise: a combination of various individual electronic parts instead of or in addition to a microcomputer; an application-specific integrated circuit (ASIC); an application-specific standard product (ASSP); a programmable-logic device such as, for example, a field-programmable gate array (FPGA); or a combination of these.

(c) The number of communication wires that constitute each of the second connection wire 49 and the second battery-connection wire 69 is not limited to one and may be two. In the situation in which the second connection wire 49 and the second battery-connection wire 69 each comprises two communication wires, one of the communication wires is a transmit-dedicated wire that transmits data from the control circuit 36 to the battery-control circuit 65, and the other communication wire is a transmit-dedicated wire that transmits data from the battery-control circuit 65 to the control circuit 36. In the situation in which the second connection wire 49 and the second battery-connection wire 69 each comprise two communication wires, the TR terminal 44 and the battery TR terminal 64 each comprise two terminals for serial communication. Furthermore, the two communication wires are connected to the terminals for serial communication. Thus, in the situation in which the second connection wire 49 and the second battery-connection wire 69 each comprise two communication wires, the communication speed between the control circuit 36 and the battery-control circuit 65 can be made higher than in the situation in which the second connection wire 49 and the second battery-connection wire 69 each comprise only one communication wire.

(d) A plurality of functions having a single structural element in the embodiments above may be implemented by a plurality of structural elements, and a single function having a single structural element may be implemented by a plurality of structural elements. In addition, a plurality of functions having a plurality of structural elements may be implemented by a single structural element, and a single function implemented by a plurality of structural elements may be implemented by a single structural element. In addition, a portion of the configuration of each embodiment above may be omitted. In addition, at least a portion of the configuration of each embodiment above may be supplemented or substituted by the configuration of other embodiments above.

(e) In addition to the electric work machine and the battery pack described above, the present disclosure can also be implemented in a variety of configurations such as a system in which the electric work machine and the battery pack serve as structural elements.

The invention claimed is:

1. A battery pack configured to supply electric power to an electric work machine, comprising:
a first battery-signal terminal that outputs, to the electric work machine, a first signal indicating that discharging is to be prohibited or permitted;
a second battery-signal terminal that outputs, to the electric work machine, a second signal indicating that discharging is to be prohibited or permitted; and
a battery-control part configured such that, in response to the battery pack having entered a state in which the battery pack should be protected, the battery-control part first transmits the second signal indicating that discharging is to be prohibited, by serial communication via the second battery-signal terminal.

2. The battery pack according to claim 1, wherein:
the first battery-signal terminal is a dedicated terminal that outputs the first signal; and
the second battery-signal terminal is a serial-communication terminal that outputs a plurality of battery signals, including the second signal.

3. The battery pack according to claim 1, wherein the second signal includes a third signal that complies with a communication protocol and a fourth signal that does not comply with the communication protocol.

4. The battery pack according to claim 3, wherein:
the electric work machine comprises a motor, a drive switch for causing the motor to be driven, and a latch circuit configured such that, in response to a signal indicating that discharging is to be prohibited being received while the drive switch is ON, the latch circuit maintains the discharge-prohibited state until the drive switch is turned OFF;
the first battery-signal terminal is connectable to the latch circuit, and the second battery-signal terminal is not connectable to the latch circuit; and
the battery-control part is configured such that, in response to the battery pack having entered the state in which the battery pack should be protected, the battery-control part first transmits the second signal indicating that discharging is to be prohibited via the second battery-signal terminal.

5. The battery pack according to claim 3, comprising:
an auto-blow-type fuse provided in an output current path of the electric power; and
a detecting part configured to detect a discharge current;
wherein the battery-control part is configured to cause the auto-blow-type fuse to blow in the event that a discharge current is detected by the detecting part even though the first signal indicating that discharging is to be prohibited is transmitted via the first battery-signal terminal and the third signal and the fourth signal indicating that discharging is to be prohibited are transmitted via the second battery-signal terminal.

6. The battery pack according to claim 3, wherein the battery pack is configured to set the frequency of serial communication via the second battery-signal terminal to be higher when electric current is flowing from the battery pack to the electric work machine than when electric current is not flowing from the battery pack to the electric work machine.

7. The battery pack according to claim 1, wherein the battery-control part is configured such that, when the battery pack has entered the state in which the battery pack should be protected, the battery-control part transmits, via the first battery-signal terminal, the first signal indicating that discharging is to be prohibited after having first transmitted, via the second battery-signal terminal, the second signal in response to a request from the electric work machine.

8. An electric work machine comprising:
the battery pack according to claim 1;
a motor configured to rotate by receiving a supply of electric power from the battery pack;
a first signal terminal connectable to the first battery-signal terminal;
a second signal terminal connectable to the second battery-signal terminal; and
a control part configured to control the drive of the motor using the first signal received via the first signal terminal and the second signal received via the second signal terminal.

9. A battery pack configured to supply electric power to an electric work machine, comprising:
a first battery-signal terminal that outputs, to the electric work machine, a first signal indicating that discharging is to be prohibited or permitted; and
a second battery-signal terminal that outputs, to the electric work machine, a second signal indicating that discharging is to be prohibited or permitted;
wherein:
the second signal includes a third signal that complies with a communication protocol and a fourth signal that does not comply with the communication protocol; and
the second battery-signal terminal is configured to continuously output a voltage of a first level during standby and to continuously output, as the fourth signal, a voltage of a second level that differs from the first level.

10. A battery pack configured to supply electric power to an electric work machine, comprising:
a first battery-signal terminal that outputs, to the electric work machine, a first signal indicating that discharging is to be prohibited or permitted;
a second battery-signal terminal that outputs, to the electric work machine, a second signal indicating that discharging is to be prohibited or permitted; and
a battery-control part;
wherein:
the second signal includes a third signal that complies with a communication protocol and a fourth signal that does not comply with the communication protocol; and
the battery-control part is configured such that, in response to the battery pack having entered a state in which the battery pack should be protected, the battery-control part first transmits, via the second battery-signal terminal, the third signal indicating that discharging is to be prohibited.

11. An electric work machine comprising:
a motor configured to rotate by receiving a supply of electric power from a battery pack;
a first signal terminal to which a first signal indicating that discharging is to be prohibited or permitted is input from the battery pack;
a second signal terminal to which a second signal indicating that discharging is to be prohibited or permitted is input from the battery pack;
a control part configured to receive the first signal input to the first signal terminal and the second signal input to the second signal terminal and to control the drive of the motor using the received first signal and the received second signal;
a first connection path that connects the first signal terminal and the control part; and
a second connection path that connects the second signal terminal and the control part,
wherein the first connection path and the second connection path are separate, independent connection paths.

12. The electric work machine according to claim 11, wherein:
the first signal terminal is a dedicated terminal configured to input the first signal; and
the second signal terminal is a terminal configured to input a plurality of battery signals, including the second signal.

13. The electric work machine according to claim 12, wherein the control part is configured to:
transmit an information-request signal, which requests a battery signal, via the second signal terminal and, in response to the information-request signal, receive the second signal that is input to the second signal terminal from the battery pack; and
receive the first signal, which indicates discharging is to be prohibited, input from the battery pack to the first signal terminal when the battery pack has entered a state in which the battery pack should be protected.

14. The electric work machine according to claim 11, wherein:
the second signal terminal is a serial-communication terminal; and
the control part is configured such that, while serial communication is not established between the electric work machine and the battery pack, the same process is performed as in the situation in which the second signal indicating that discharging is to be prohibited has been received.

15. The electric work machine according to claim 11, wherein:
the second signal terminal is a serial-communication terminal; and
the battery pack or the electric work machine is configured to set the frequency of serial communication via the second signal terminal to be higher when electric current is flowing from the battery pack to the electric work machine than when electric current is not flowing from the battery pack to the electric work machine.

16. The electric work machine according to claim 11, wherein the control part is configured to:
stop the drive of the motor in response to a signal indicating that discharging is to be prohibited being received at a first timing via the first signal terminal or the second signal terminal; and
prohibit restarting of the motor as long as a prescribed cancellation condition is not met in response to the signal terminal, from among the first signal terminal and the second signal terminal, that is not receiving at the first timing a signal indicating that discharging is to be prohibited continuing to not receive a signal indicating that discharging is to be prohibited in the interval from the first timing until a set time has elapsed.

17. The electric work machine according to claim 16, wherein the prescribed cancellation condition includes removal of the battery pack from the electric work machine.

18. The electric work machine according to claim 11, further comprising the battery pack which comprises:
a first battery-signal terminal that outputs, to the first signal terminal of the electric work machine, the first signal indicating that discharging is to be prohibited or permitted; and
a second battery-signal terminal that outputs, to the second signal terminal of the electric work machine, the second signal indicating that discharging is to be prohibited or permitted.

19. An electric work machine comprising:
- a motor configured to rotate by receiving a supply of electric power from a battery pack;
- a first signal terminal to which a first signal indicating that discharging is to be prohibited or permitted is input from the battery pack;
- a second signal terminal to which a second signal indicating that discharging is to be prohibited or permitted is input from the battery pack; and
- a control part configured to receive the first signal input to the first signal terminal and the second signal input to the second signal terminal and to control the drive of the motor using the received first signal and the received second signal;
- wherein when the first signal terminal is not connected to the battery pack, the control part is configured to receive, via the first signal terminal, the first signal indicating that discharging is to be prohibited.

20. The electric work machine according to claim 19, further comprising the battery pack which comprises:
- a first battery-signal terminal that outputs, to the first signal terminal of the electric work machine, the first signal indicating that discharging is to be prohibited or permitted; and
- a second battery-signal terminal that outputs, to the second signal terminal of the electric work machine, the second signal indicating that discharging is to be prohibited or permitted.

21. An electric work machine comprising:
- a motor configured to rotate by receiving a supply of electric power from a battery pack;
- a first signal terminal to which a first signal indicating that discharging is to be prohibited or permitted is input from the battery pack;
- a second signal terminal to which a second signal indicating that discharging is to be prohibited or permitted is input from the battery pack; and
- a control part configured to receive the first signal input to the first signal terminal and the second signal input to the second signal terminal and to control the drive of the motor using the received first signal and the received second signal,
- wherein the control part is configured such that, only when both the first signal indicating that discharging is to be permitted is received and the second signal indicating that discharging is to be permitted is received, the control part permits discharging from the battery pack to the motor and thereby driving of the motor.

22. The electric work machine according to claim 21, further comprising the battery pack which comprises:
- a first battery-signal terminal that outputs, to the first signal terminal of the electric work machine, the first signal indicating that discharging is to be prohibited or permitted; and
- a second battery-signal terminal that outputs, to the second signal terminal of the electric work machine, the second signal indicating that discharging is to be prohibited or permitted.

* * * * *